US009336575B2

(12) United States Patent
Asano

(10) Patent No.: US 9,336,575 B2
(45) Date of Patent: May 10, 2016

(54) IMAGE PROCESSING APPARATUS, IMAGE PROCESSING METHOD, AND IMAGE PROCESSING PROGRAM

(71) Applicant: KONICA MINOLTA, INC., Chiyoda-ku, Tokyo (JP)

(72) Inventor: Motohiro Asano, Osaka (JP)

(73) Assignee: KONICA MINOLTA, INC. (JP)

( * ) Notice: Subject to any disclaimer, the term of this patent is extended or adjusted under 35 U.S.C. 154(b) by 0 days.

(21) Appl. No.: 14/410,809

(22) PCT Filed: Jun. 17, 2013

(86) PCT No.: PCT/JP2013/066580
§ 371 (c)(1),
(2) Date: Dec. 23, 2014

(87) PCT Pub. No.: WO2014/002811
PCT Pub. Date: Jan. 3, 2014

(65) Prior Publication Data
US 2015/0187054 A1   Jul. 2, 2015

(30) Foreign Application Priority Data

Jun. 25, 2012   (JP) ................................. 2012-142262

(51) Int. Cl.
*G06K 9/00* (2006.01)
*G06T 5/00* (2006.01)
(Continued)

(52) U.S. Cl.
CPC .................. *G06T 5/003* (2013.01); *G06T 5/006* (2013.01); *G06T 5/50* (2013.01); *H04N 5/3572* (2013.01);
(Continued)

(58) Field of Classification Search
USPC ......... 382/167, 162, 100, 232, 233, 238, 275, 382/199, 300; 315/155, 158, 152; 345/591, 345/690, 691, 692; 348/273, 333.02, 340, 348/370, E9.01, 279; 358/3.28
See application file for complete search history.

(56) References Cited

U.S. PATENT DOCUMENTS 7,706,608 B2 * 4/2010 Sawada ................. H04N 1/648
382/167
8,463,035 B2 * 6/2013 Bechtel ..................... B60R 1/00
348/273
(Continued)

FOREIGN PATENT DOCUMENTS

JP      5-344338 A    12/1993
JP    2007-28041 A     2/2007
(Continued)

OTHER PUBLICATIONS

International Search Report for PCT/JP2013/066580; Date of Mailing Sep. 17, 2013; with English Translation.

*Primary Examiner* — Anh Do
(74) *Attorney, Agent, or Firm* — Cantor Colburn LLP

(57) ABSTRACT

An image processing apparatus includes an acquisition unit configured to acquire an input image represented with a plurality of color components including at least first and second color components, a correlation calculation unit configured to calculate a grayscale direction correlation indicating whether grayscale directions of the first color component and the second color component are identical or opposite for a region of interest in the input image, a high frequency component calculation unit configured to calculate a high frequency component of the first color component for the region of interest, and a correction unit configured to correct the second color component for the region of interest using the high frequency component of the first color component calculated by the high frequency component calculation unit in accordance with a method depending on the grayscale direction correlation calculated by the correlation calculation unit.

13 Claims, 40 Drawing Sheets

(51) Int. Cl.
*H04N 5/357* (2011.01)
*H04N 9/04* (2006.01)
*G06T 5/50* (2006.01)
*H04N 9/64* (2006.01)

(52) U.S. Cl.
CPC ............... *H04N 9/045* (2013.01); *H04N 9/646* (2013.01); *G06T 2207/10004* (2013.01); *G06T 2207/10024* (2013.01); *G06T 2207/20201* (2013.01)

(56) References Cited

U.S. PATENT DOCUMENTS 8,576,257 B2 * 11/2013 Kiya .................... G09G 3/2007
                                                          345/690
2009/0074324 A1    3/2009  Ishiga et al.

FOREIGN PATENT DOCUMENTS

JP        2009-206552 A    9/2009
JP        2010-28374 A     2/2010

* cited by examiner

FIG.11
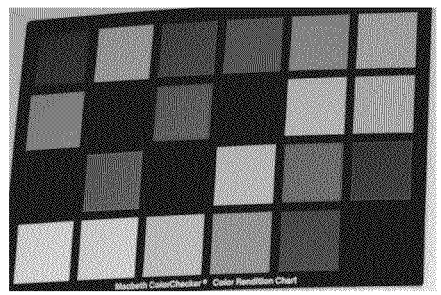
Y'
(CORRECTED Y)
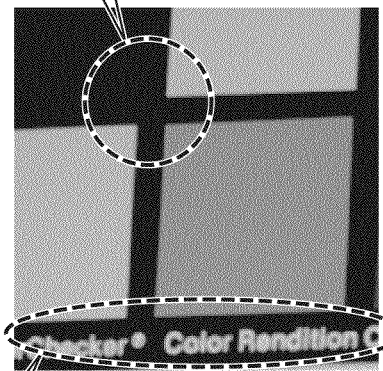
EDGE IS SHARPENED
EDGE IS SHARPENED
ENLARGED VIEW
(a)
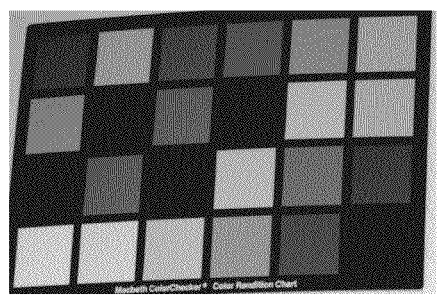
Y0
(Y OF ORIGINAL IMAGE)
ENLARGED VIEW
(b)

FIG.12
(a) R' = Y' + 1.402 × Cr0
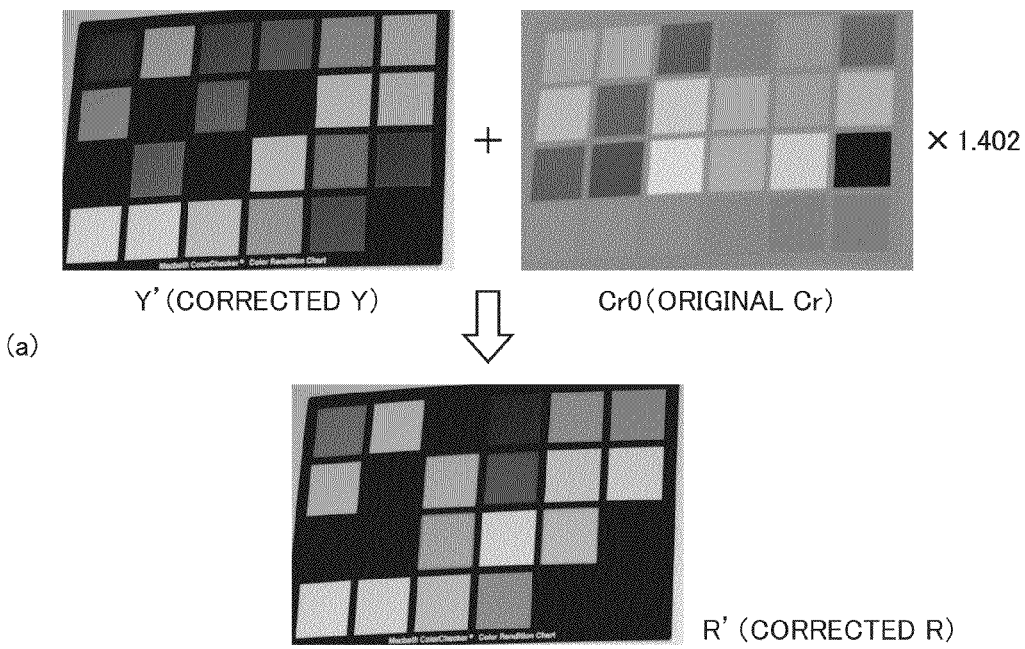
Y' (CORRECTED Y) + Cr0 (ORIGINAL Cr) × 1.402
R' (CORRECTED R)
(b) B' = Y' + 1.772 × Cb0
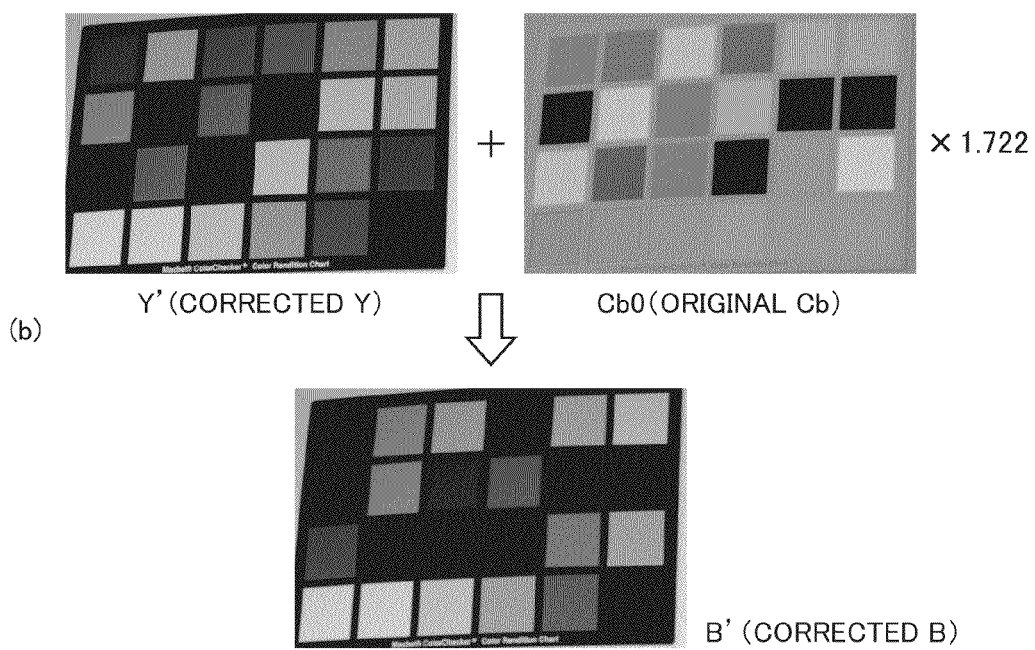
Y' (CORRECTED Y) + Cb0 (ORIGINAL Cb) × 1.722
B' (CORRECTED B)

FIG.13
INPUT IMAGE
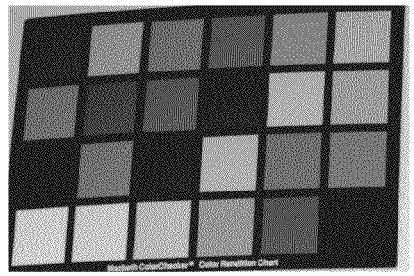
RGB0
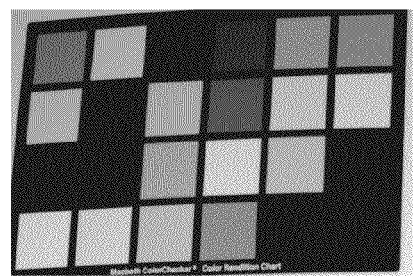
R0
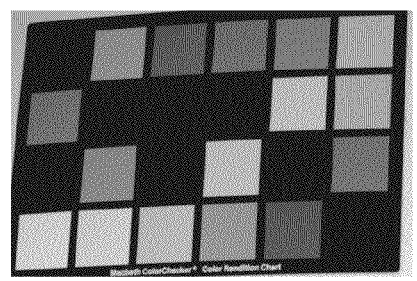
G0
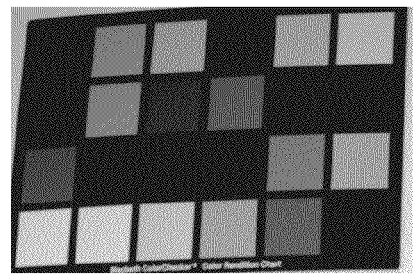
B0
CORRECTED IMAGE
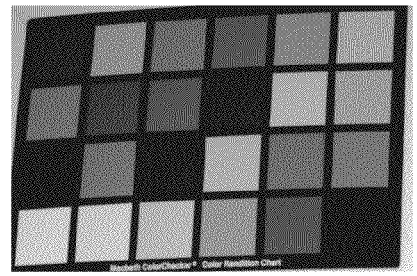
RGB'
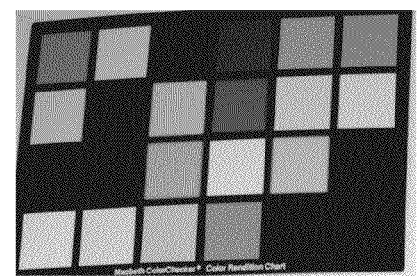
R'
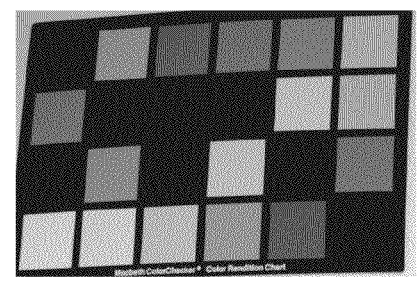
G' (UNCORRECTED, SAME AS G0)
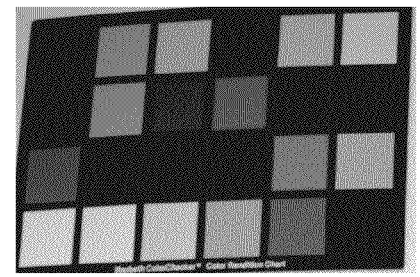
B'

FIG.14
INPUT IMAGE
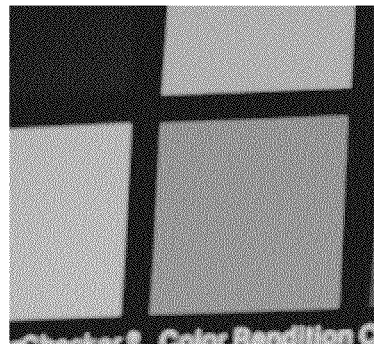
RGB0
R0
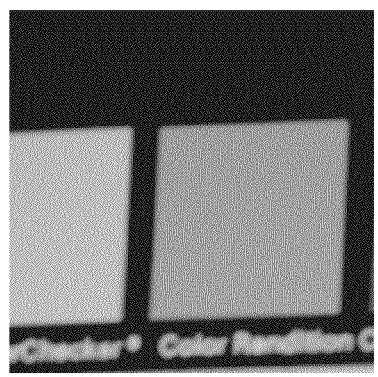
B0
CORRECTED IMAGE
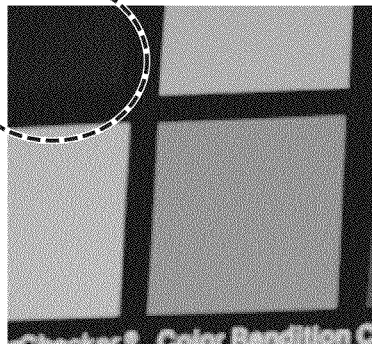
RGB'
RED IS BLURRED ON THE CONTRARY
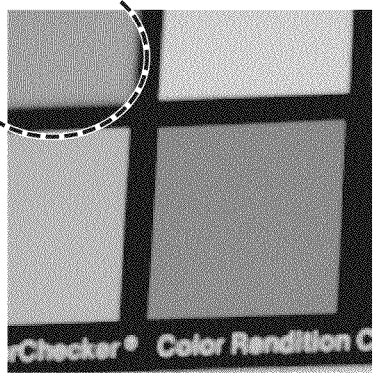
R'
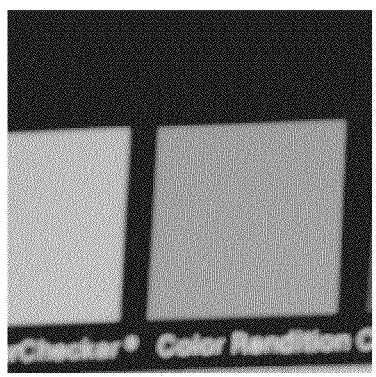
B'

FIG.16
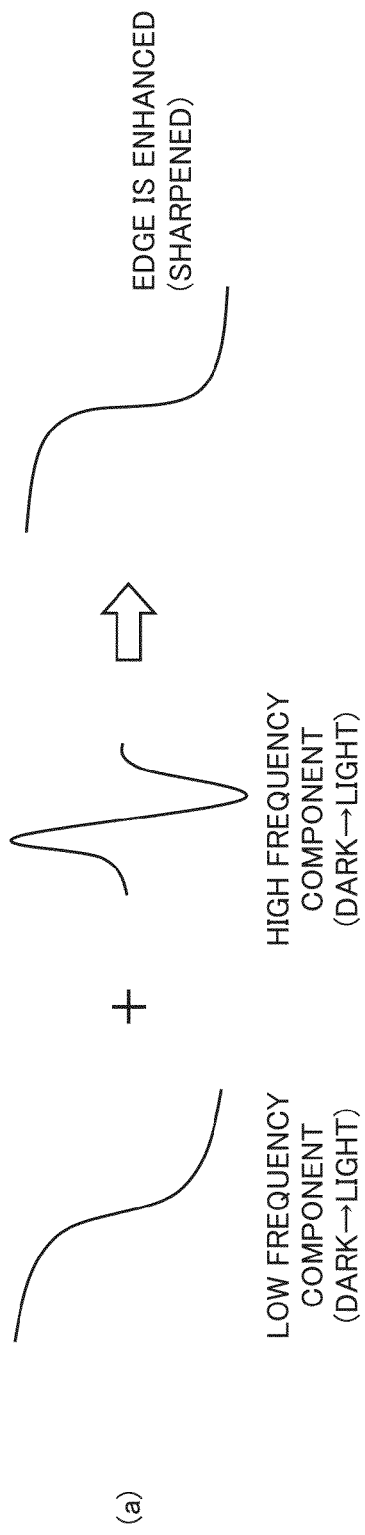
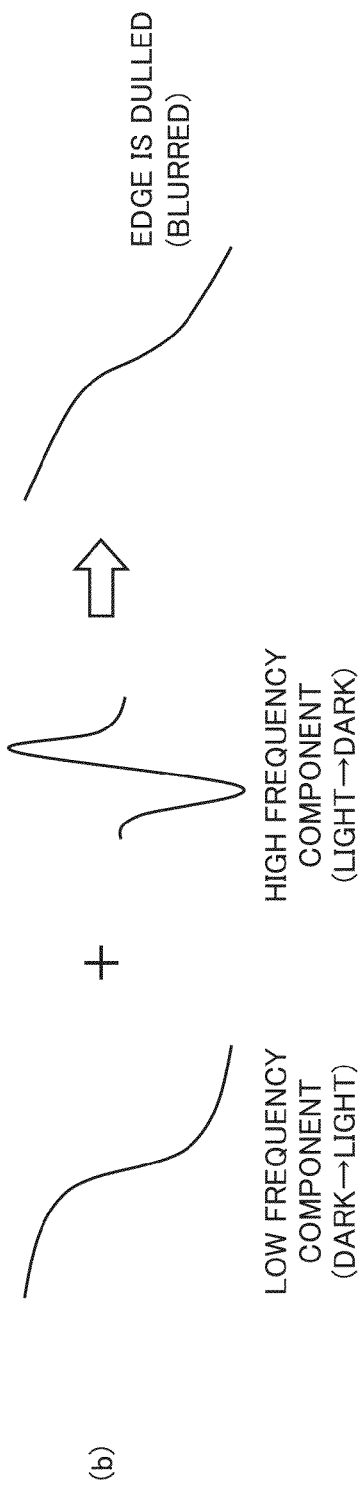

FIG.20
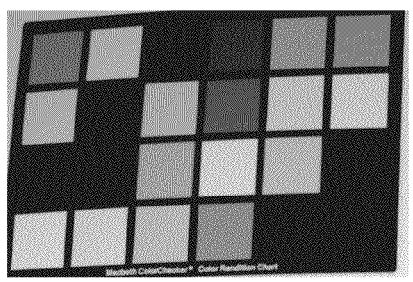
R0
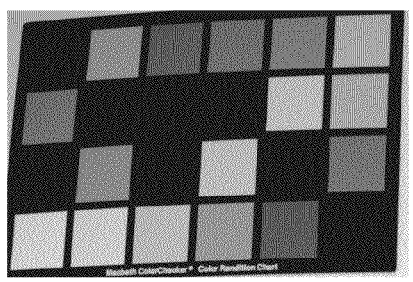
G0
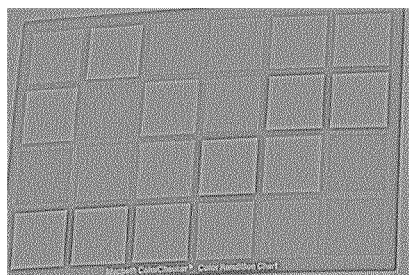
RH
(HIGH FREQUENCY
COMPONENT OF R)
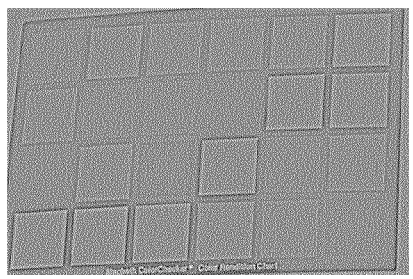
GH
(HIGH FREQUENCY
COMPONENT OF G)

WHITE : 1.0
BLACK : -1.0 (EXACTLY REVERSED)

CORRELATION VALUE OF
HIGH FREQUENCY COMPONENTS
(NCC VALUE OF RH AND GH)

FIG.23
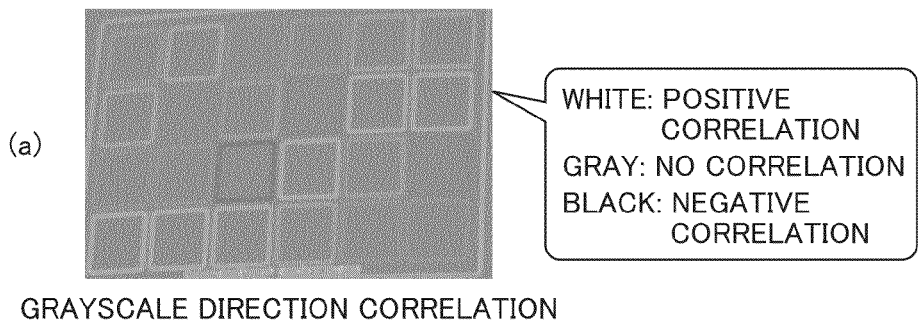
(a)
WHITE: POSITIVE
        CORRELATION
GRAY: NO CORRELATION
BLACK: NEGATIVE
        CORRELATION
GRAYSCALE DIRECTION CORRELATION
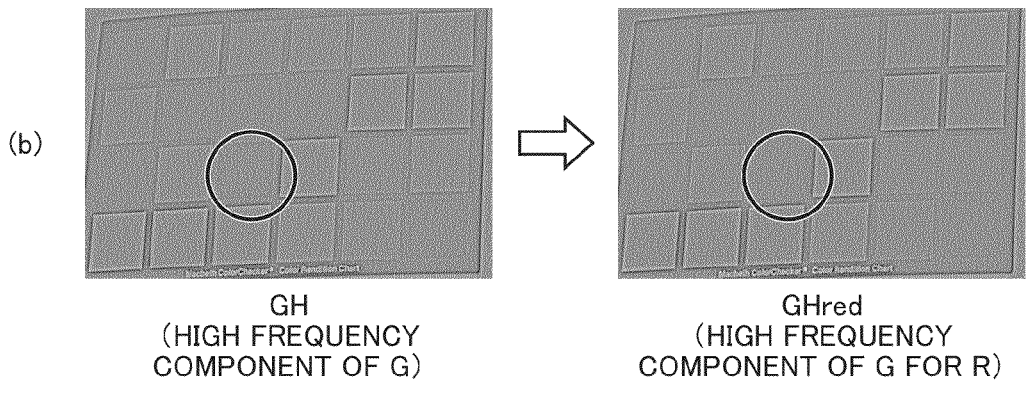
(b)
GH
(HIGH FREQUENCY
COMPONENT OF G)
GHred
(HIGH FREQUENCY
COMPONENT OF G FOR R)
HIGH FREQUENCY COMPONENT IS NOT ADDED
FOR PIXEL HAVING NEGATIVE CORRELATION
GHred = GH × c
(GRAYSCALE DIRECTION CORRELATION)

FIG.27
R' = Y'red + 1.402 × Cr0
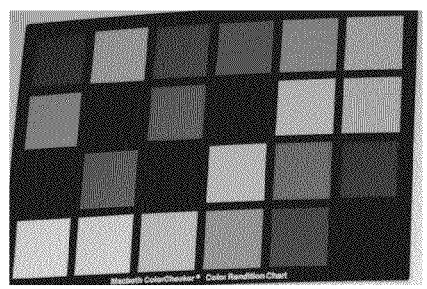
CORRECTED Y'red FOR R
+
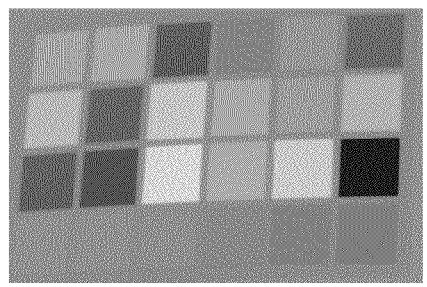
× 1.402
Cr0 (ORIGINAL Cr)
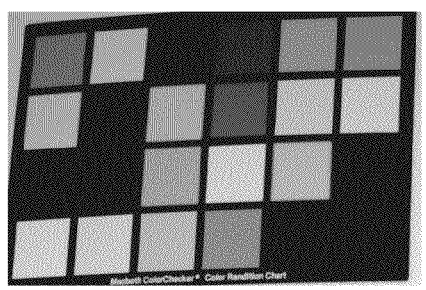
R" (CORRECTED R IN
PRESENT EMBODIMENT)

FIG.28
CORRECTED IMAGE
(PRESENT EMBODIMENT)
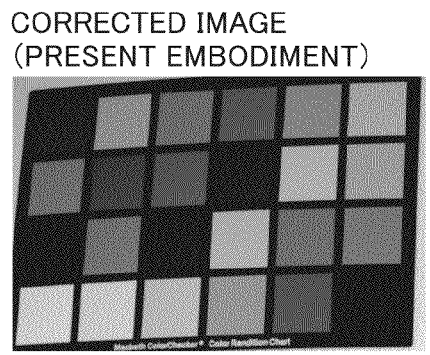
RGB"
CORRECTED IMAGE
(RELATED ART)
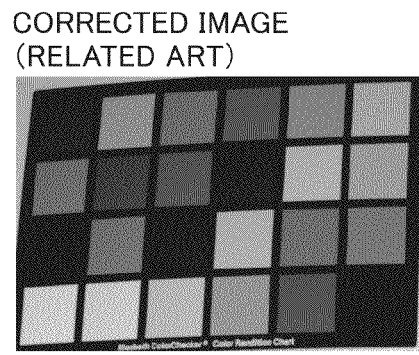
RGB'
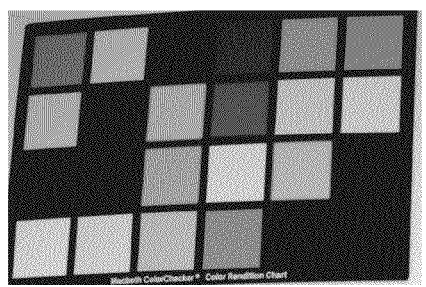
R"(CORRECTED R IN
PRESENT EMBODIMENT)
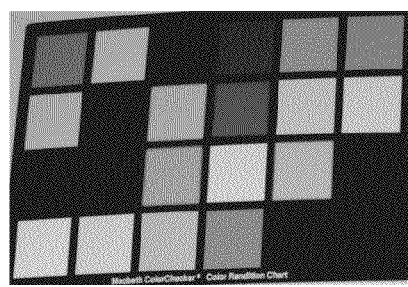
R' (RELATED ART)
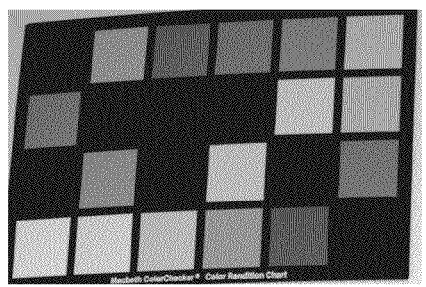
G'
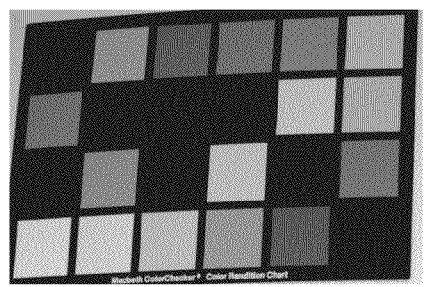
G'
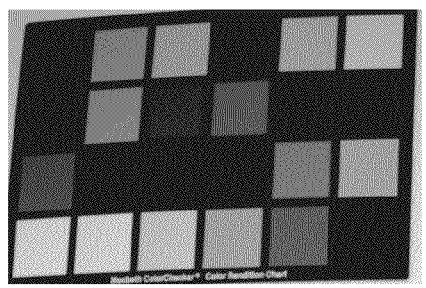
B'
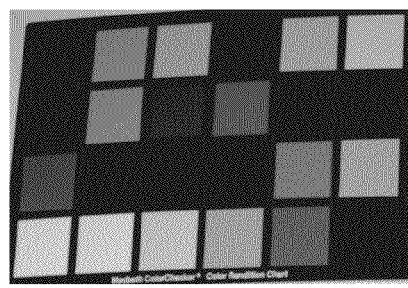
B'

FIG.31
(a)
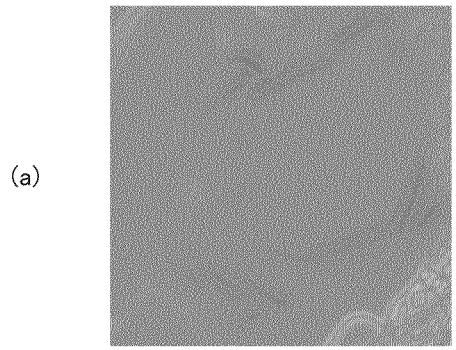
GRAYSCALE DIRECTION
CORRELATION
(b)
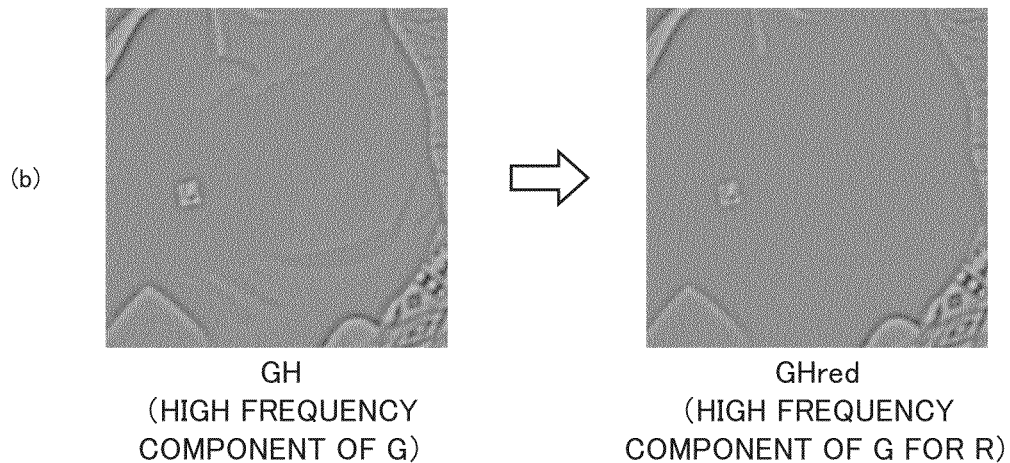
GH
(HIGH FREQUENCY
COMPONENT OF G)
GHred
(HIGH FREQUENCY
COMPONENT OF G FOR R)

FIG.36
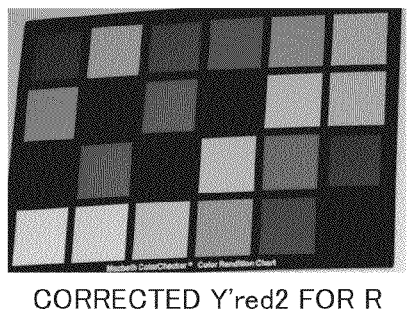
CORRECTED Y'red2 FOR R
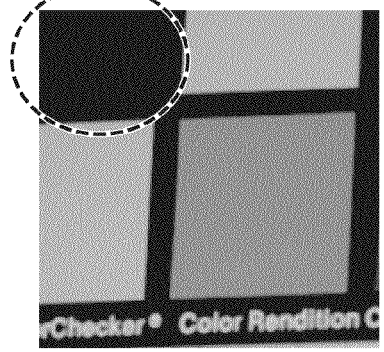
ENHANCE EDGE OPPOSITELY FOR NEGATIVE CORRELATION PORTION
ENLARGED VIEW
FOR COMPARISON:
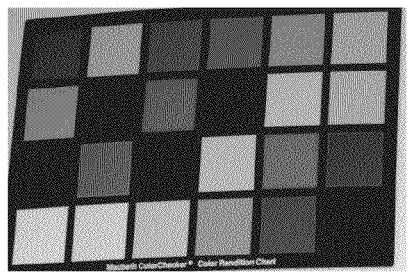
Y'
(CORRECTED Y IN
RELATED ART EXAMPLE)
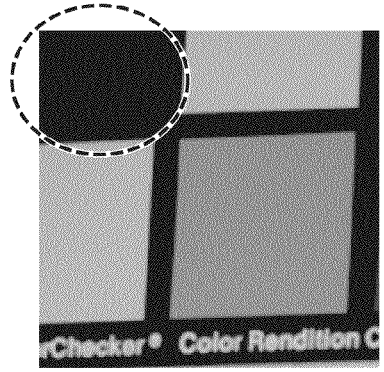
ENLARGED VIEW
(RELATED ART EXAMPLE)

IMAGE PROCESSING APPARATUS, IMAGE PROCESSING METHOD, AND IMAGE PROCESSING PROGRAM

CROSS REFERENCE TO RELATED APPLICATION

This is the U.S. national stage of application No. PCT/JP2013/066580, filed on Jun. 17, 2013. Priority under 35 U.S.C. §119(a) and 35 U.S.C. §365(b) is claimed from Japanese Application No. 2012142262 filed Jun. 25, 2012, the disclosure of which is also incorporated herein by reference.

TECHNICAL FIELD

The present invention relates to an image processing apparatus, an image processing method, and an image processing program for correcting blurs in images.

BACKGROUND ART

When an image is captured through an optical system such as a lens, for example, axial chromatic aberration of the lens may occur. This may cause a blur in the image obtained by image capturing. For example, Japanese Laid-Open Patent Publication No. 2007-028041 (PTD 1) discloses a method of performing chromatic aberration correction in an image captured through an optical system. More specifically, according to this prior art, different kinds of processes for correcting MTF by smoothing or sharpening are performed on one color component of at least two color components of a first image having MTF characteristics different between the at least two color components in an imaging surface, and color responses are compared between them. Then, based on the comparison result of the color responses, one MTF correction process is decided from among the different kinds of MTF processes, and the MFP characteristic of one color component of the at least two color components is matched with the MTF characteristic of the other color components.

CITATION LIST

Patent Document

PTD1: Japanese Laid-Open Patent Publication No. 2007-028041

SUMMARY OF INVENTION

Technical Problem

When a blur due to chromatic aberration is corrected in accordance with the method disclosed in the prior art above, a part of the region is blurred on the contrary or the edge undergoes unnatural image processing. The present invention is then made in order to solve such a problem and aims to provide an image processing apparatus, an image processing method, and an image processing program capable of correcting a blur due to chromatic aberration more properly.

Solution To Problem

An image processing apparatus according to an embodiment of the present invention includes an acquisition unit that acquires an input image represented with a plurality of color components including at least first and second color components, a correlation calculation unit that calculates a grayscale direction correlation indicating whether grayscale directions of the first color component and the second color component are identical or opposite for a region of interest in the input image, a high frequency component calculation unit that calculates a high frequency component of the first color component for the region of interest, and a correction unit that corrects the second color component for the region of interest using the high frequency component of the first color component calculated by the high frequency component calculation unit in accordance with a method depending on the grayscale direction correlation calculated by the correlation calculation unit.

Preferably, the correction unit adds the high frequency component of the first color component to the second color component when the grayscale direction correlation for the region of interest indicates a positive correlation in which grayscale directions of the first color component and the second color component are identical. The correction unit does not correct the second color component using the high frequency component of the first color component when the grayscale direction correlation for the region of interest indicates a negative correlation in which grayscale directions of the first color component and the second color component are opposite.

Further preferably, the correction unit determines that the grayscale direction correlation for the region of interest is the positive correlation when the grayscale direction correlation for the region of interest exceeds a predetermined value $\alpha$ ($\alpha>0$), and determines that the grayscale direction correlation for the region of interest is the negative correlation when the grayscale direction correlation for the region of interest falls below a predetermined value $\beta$ ($\beta<0$). The correction unit adds the high frequency component of the first color component that is reduced compared with a case of the positive correlation, to the second color component when the grayscale direction correlation for the region of interest falls within a range from the predetermined value $\alpha$ to the predetermined value $\beta$.

Preferably, the correction unit adds the high frequency component of the first color component to the second color component when the grayscale direction correlation for the region of interest indicates a positive correlation in which grayscale directions of the first color component and the second color component are identical. The correction unit adds the high frequency component of the first color component that is reduced compared with a case of the positive correlation, to the second color component when the grayscale direction correlation for the region of interest indicates a negative correlation in which grayscale directions of the first color component and the second color component are opposite.

Preferably, the correction unit adds the high frequency component of the first color component to the second color component when the grayscale direction correlation for the region of interest indicates a positive correlation in which grayscale directions of the first color component and the second color component are identical. The correction unit subtracts the high frequency component of the first color component from the second color component when the grayscale direction correlation for the region of interest indicates a negative correlation in which grayscale directions of the first color component and the second color component are opposite.

Preferably, the correction unit determines whether the region of interest includes many high frequency components. If the region of interest does not include many high frequency components, the correction unit corrects the second color component for the region of interest in accordance with a method depending on the grayscale direction correlation. If the region of interest includes many high frequency components, the correction unit corrects the second color component for the region of interest in accordance with a predetermined method, independently of the grayscale direction correlation.

Preferably, the correction unit corrects a frequency band degraded compared with an MTF characteristic of the first color component, among MTF characteristics of the second color component.

Preferably, the correlation calculation unit calculates the grayscale direction correlation based on high frequency components included in the first color component and the second color component.

Further preferably, the correlation calculation unit calculates the grayscale direction correlation using a correlation value obtained through pattern matching of the high frequency components included in the first color component and the second color component.

Further preferably, the correlation calculation unit calculates the grayscale direction correlation by multiplying the correlation value by the magnitude of grayscale change of the second color component.

Further preferably, the correlation calculation unit calculates the correlation value using an NCC method.

An image processing method according to another embodiment of the present invention includes the steps of: acquiring an input image represented with a plurality of color components including at least first and second color components; calculating a grayscale direction correlation indicating whether grayscale directions of the first color component and the second color component are identical or opposite for a region of interest in the input image; calculating a high frequency component of the first color component for the region of interest; and correcting the second color component for the region of interest using the high frequency component of the first color component in accordance with a method depending on the grayscale direction correlation.

According to yet another embodiment of the present invention, an image processing program causing a computer to perform image processing is provided. The image processing program causes the computer to perform the steps of: acquiring an input image represented with a plurality of color components including at least first and second color components; calculating a grayscale direction correlation indicating whether grayscale directions of the first color component and the second color component are identical or opposite for a region of interest in the input image; calculating a high frequency component of the first color component for the region of interest; and correcting the second color component for the region of interest using the high frequency component of the first color component in accordance with a method depending on the grayscale direction correlation.

Advantageous Effects of Invention

According to the present invention, a blur due to chromatic aberration can be corrected more properly.

BRIEF DESCRIPTION OF DRAWINGS

FIG. 11 is a diagram for explaining the effect by the correction process for an input image in the image processing method related to the present invention.

FIG. 12 is a diagram for explaining the process of color conversion to the RGB color space in the image processing method related to the present invention.

FIG. 13 is a diagram showing an example of the correction result in accordance with the image processing method related to the present invention.

FIG. 14 is an enlarged view of the correction result shown in FIG. 13.

FIG. 16 is a diagram for explaining the problem caused by the correction by the image processing method related to the present invention.

FIG. 20 is a diagram showing a step in the process of calculating the grayscale direction correlation in the image processing method according to the first embodiment of the present invention.

FIG. 23 is a diagram showing the process for calculating a high frequency component for correction according to the first embodiment of the present invention.

FIG. 27 is a diagram for explaining the process of color conversion to the RGB color space in the image processing method according to the first embodiment of the present invention.

FIG. 28 is a diagram showing an example of the correction result by the image processing method according to the first embodiment of the present invention.

FIG. 31 is a diagram showing another example of the correction result by the image processing method according to the first embodiment of the present invention.

FIG. 36 is a diagram for explaining the effect of correction by the correction process for an input image shown in FIG. 35.

DESCRIPTION OF EMBODIMENTS

Embodiments of the present invention will be described in details with reference to the figures. It is noted that in the figures the same or corresponding parts are denoted with the same reference signs and a description thereof are not repeated.

<A. Overview>

An image processing apparatus according to an embodiment of the present invention is suitable, typically, for image correction processing in which when an input image includes a blur due to axial aberration of an optical system or other reasons, the high frequency component of the color (for example, G) with the best MTF characteristic is corrected using the high frequency component of another color (for example, R).

The image processing apparatus according to an embodiment of the present invention calculates a grayscale direction correlation between colors in the same region for an input image represented with a plurality of color components and optimizes a correction method using the high frequency component in accordance with the calculated grayscale direction correlation.

<B. System Configuration>

First, a configuration of the image processing apparatus according to an embodiment of the present invention will be described.

(b 1: Basic Configuration)

Figure 1:
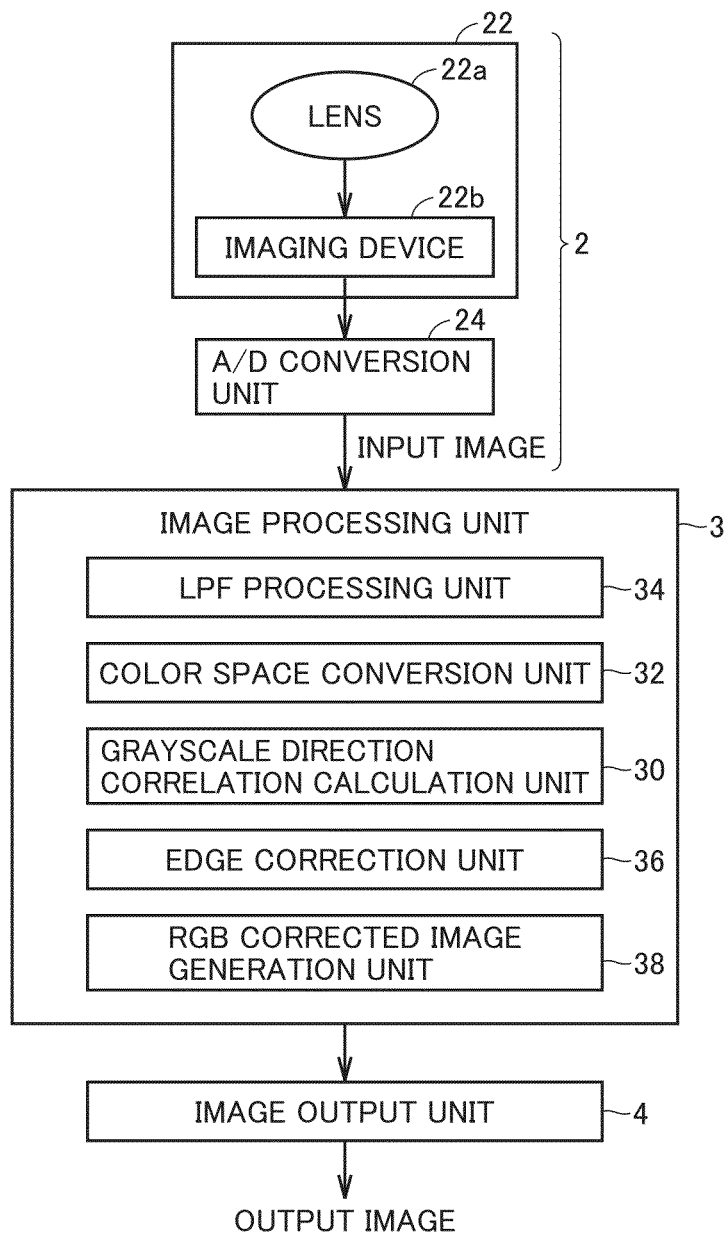
FIG. 1 is a block diagram showing a basic configuration of an image processing apparatus according to an embodiment of the present invention.

FIG. 1 is a block diagram showing a basic configuration of an image processing apparatus 1 according to an embodiment of the present invention. Referring to FIG. 1, image processing apparatus 1 includes an imaging unit 2, an image processing unit 3, and an image output unit 4. In image processing apparatus 1 shown in FIG. 1, imaging unit 2 acquires an image (hereinafter also referred to as an "input image") by imaging a subject, and image processing unit 3 corrects a blur in the input image by performing image processing described later on the acquired input image. Image output unit 4 then outputs the input image subjected to the correction (hereinafter also referred to as a "corrected image") to a display device or other devices.

Imaging unit 2 images an object (subject) to generate an input image. More specifically, imaging unit 2 includes a camera 22 and an A/D (Analog to Digital) conversion unit 24 connected to camera 22. The A/D conversion unit 24 outputs the input image showing the subject imaged by camera 22.

Camera 22 includes a lens 22a that is an optical system for imaging a subject and an imaging device 22b that is a device for converting light collected by lens 22a into an electrical signal. A/D conversion unit 24 converts a video signal (analog electrical signal) indicating the subject that is output from imaging device 22b into a digital signal and outputs the digital signal. Imaging unit 2 may further include, for example, a control processing circuit for controlling each component.

Image processing unit 3 performs the image processing method according to the present embodiment on the input image acquired by imaging unit 2 to correct a blur included in the input image. More specifically, image processing unit 3 includes an LPF (Low Pass Filter) processing unit 30, a color space conversion unit 32, a grayscale direction correlation calculation unit 34, an edge correction unit 36, and an RGB corrected image generation unit 38.

LPF processing unit 30 extracts a low frequency component from the input image to be processed.

Color space conversion unit 32 converts the color space of the input image to be processed. Specifically, color space conversion unit 32 converts the input image of the RGB color space into an image of the YCrCb color space.

Grayscale direction correlation calculation unit 34 calculates a grayscale direction correlation for the input image to be processed. The details of this grayscale direction correlation will be described later.

Edge correction unit 36 performs edge correction for correcting a blur in the input image.

RGB corrected image generation unit 38 reconverts the edge-corrected input image to an image of the RGB color space and outputs the converted image. Image output unit 4 outputs the image of the corrected image generated by image processing unit 3 to a display device or other devices.

The details of the processing in each unit will be described later. Image processing apparatus 1 shown in FIG. 1 can be configured with independent units but, in general, is often implemented as, for example, a digital camera or a personal computer as described below. Implementation examples of image processing apparatus 1 according to the present embodiment will be described.

(b2: Implementation Example 1)

Figure 2:
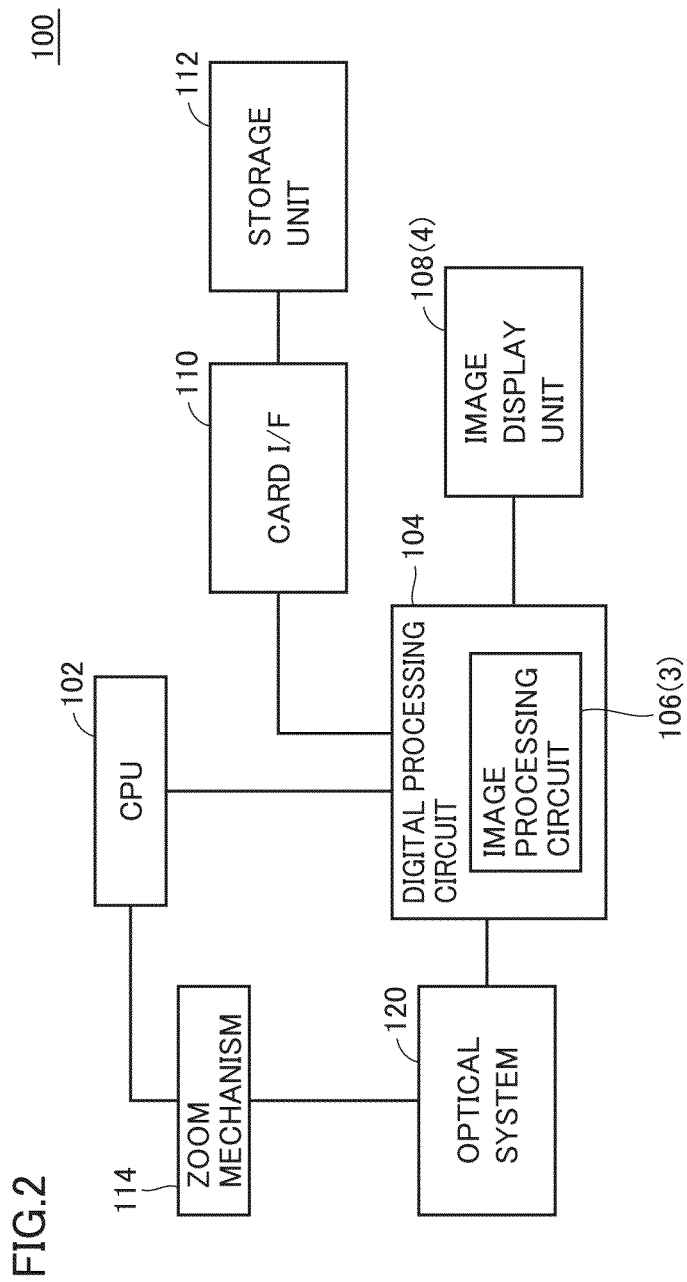
FIG. 2 is a block diagram showing a configuration of a digital camera that embodies the image processing apparatus shown in FIG. 1.

FIG. 2 is a block diagram showing a configuration of a digital camera 100 that embodies image processing apparatus 1 shown in FIG. 1. In FIG. 2, the components corresponding to the blocks included in image processing apparatus 1 shown in FIG. 1 are denoted with the same reference signs as in FIG. 1.

Referring to FIG. 2, digital camera 100 includes a CPU (Central Processing Unit) 102, a digital processing circuit 104, an image display unit 108, a card interface (I/F) 110, a storage unit 112, a zoom mechanism 114, and an optical system 120.

CPU 102 executes, for example, a program stored in advance to control the entire digital camera 100. Digital processing circuit 104 executes a variety of digital processing including the image processing according to the present embodiment. Digital processing circuit 104 is typically configured with, for example, a DSP (Digital Signal Processor), an ASIC (Application Specific Integrated Circuit), an LSI (Large Scale Integration), or an FPGA (Field-Programmable Gate Array). This digital processing circuit 104 includes an image processing circuit 106 for implementing the function provided by image processing unit 3 shown in FIG. 1.

Image display unit 108 displays, for example, an input image provided by optical system 120, an output image generated by digital processing circuit 104 (image processing circuit 106), a variety of setting information in connection with digital camera 100, and a control GUI (Graphical User Interface) screen.

Card interface (I/F) 110 is an interface for writing image data generated by image processing circuit 106 into storage unit 112 or reading image data or other data from storage unit 112. Storage unit 112 is a storage device for storing image data generated by image processing circuit 106 and a variety of information (setting values such as control parameters and operation modes of digital camera 100). This storage unit 112 includes a flash memory, an optical disk, a magnetic disk, or other devices to store data in a nonvolatile manner.

Zoom mechanism 114 is a mechanism for changing the imaging magnification of optical system 120 in response to the user's operation. Zoom mechanism 114 typically includes, for example, a servo motor to change a focal length by driving lens unit(s) included in optical system 120.

Optical system 120 images a subject to generate an input image.

Digital camera 100 shown in FIG. 2 embodies the entire image processing apparatus 1 according to the present embodiment as a single device. That is, the user uses digital camera 100 to image a subject and thereby stereoscopically views the subject on the image display unit 108.

(b3: Implementation Example 2)

Figure 3:
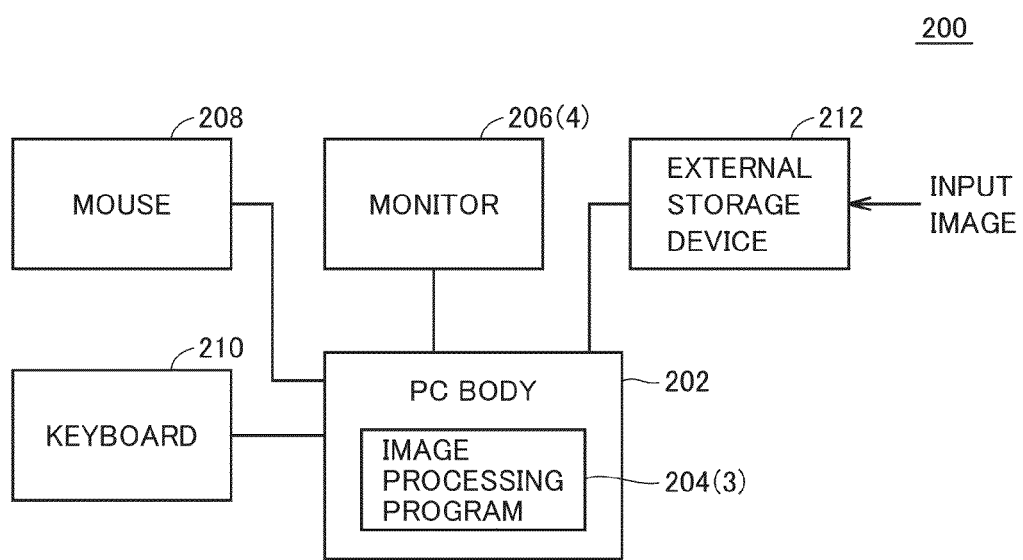
FIG. 3 is a block diagram showing a configuration of a personal computer that embodies the image processing apparatus shown in FIG. 1.

FIG. 3 is a block diagram showing a configuration of a personal computer 200 that embodies image processing apparatus 1 shown in FIG. 1. Personal computer 200 shown in FIG. 3 is not equipped with imaging unit 2 for acquiring an input image and externally receives an input image acquired by any imaging unit 2. Such a configuration may also be embraced in image processing apparatus 1 according to an embodiment of the present invention. Also in FIG. 3, the components corresponding to the blocks included in image processing apparatus 1 shown in FIG. 1 are denoted with the same reference signs as in FIG. 1.

Referring to FIG. 3, personal computer 200 includes a personal computer body 202, a monitor 206, a mouse 208, a keyboard 210, and an external storage device 212.

Personal computer body 202 is typically a general computer with a general architecture and mainly includes a CPU, a RAM (Random Access Memory), and a ROM (Read Only Memory) as basic components. Personal computer body 202 can execute an image processing program 204 for implementing the function provided by image processing unit 3 shown in FIG. 1. Such an image processing program 204 is distributed in a storage device such as a CD-ROM (Compact Disk-Read Only Memory) or distributed from a server apparatus through a network. Image processing program 204 is then stored into a storage area of, for example, a hard disk in personal computer body 202.

Such an image processing program 204 may be configured so as to invoke necessary modules of the program modules provided as part of the operating system (OS) executed in personal computer body 202, in a predetermined timing and order. In this case, image processing program 204 does not include the modules provided by the OS per se and cooperates with the OS to perform image processing. Image processing program 204 may not be a single program but may be embedded in part of any given program. Also in such a case, image processing program 204 does not include such modules shared by the given program and cooperates with the given program to perform image processing. Such an image processing program 204 that does not include a part of the modules does not depart from the spirit of image processing apparatus 1 according to the present embodiment.

Part or the whole of the functions provided by image processing program 204 may be implemented by dedicated hardware, as a matter of course.

Monitor 206 displays, for example, a GUI screen provided by the operating system (OS) and an image generated by image processing program 204.

Mouse 208 and keyboard 210 each accept a user operation and output the content of the accepted user operation to personal computer body 202.

External storage device 212 stores an input image acquired by any method and outputs the input image to personal computer body 202. External storage device 212 used is a device that stores data in a nonvolatile manner, such as a flash memory, an optical disk, or a magnetic disk.

Personal computer 200 shown in FIG. 3 is an implementation of part of image processing apparatus 1 according to the present embodiment as a single device.

<C. Chromatic Aberration>

In the image processing apparatus and the image processing method according to the present embodiment, typically, chromatic aberration (axial aberration) that occurs in the optical system is corrected.

Figure 4:
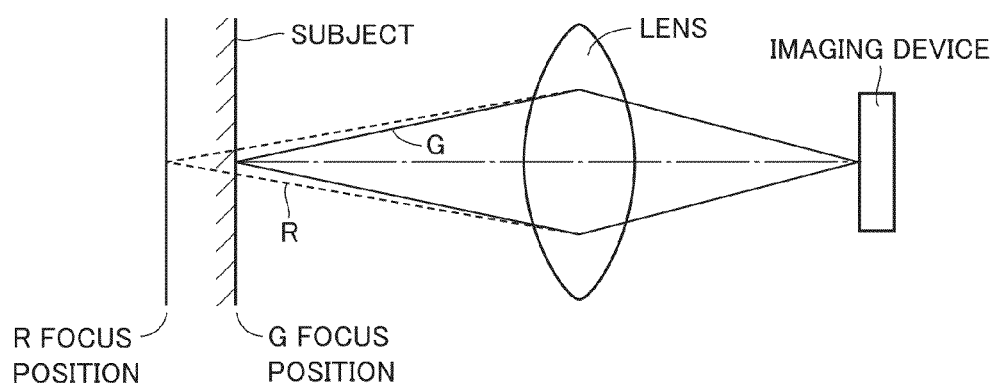
FIG. 4 is a diagram for explaining chromatic aberration to be corrected by the image processing apparatus and the image processing method according to an embodiment of the present invention.

FIG. 4 is a diagram for explaining chromatic aberration to be corrected by the image processing apparatus and the image processing method according to an embodiment of the present invention. As shown in FIG. 4, chromatic aberration is a phenomenon that occurs because the refractive index of light passing through a lens differs among wavelengths. For example, it is assumed that in a case where an imaging device has sensitivity to three colors, namely, R (red), G (green), and B (blue), the focus is adjusted to G. That is, in terms of the wavelength corresponding to G, the focus is achieved at a surface position of the subject (target position) (G focus position). By comparison, in terms of the wavelengths corresponding to R and B, the refractive index differs from the refractive index of the wavelength corresponding to G in the lens, so that the focus is achieved at a position different from the surface position of the subject (R focus position).

As described above, chromatic aberration refers to the state in which the positions of focusing differ among wavelength components included in light, and this causes a blur for the R component although not causing a blur for the G component of the input image. The present embodiment provides the image processing method for correcting such a blur.

More specifically, the present embodiment contemplates a process of correcting a blur for an image in which a blur does not occur in a certain color component (for example, G) but a blur occurs in other color components (for example, R or B) due to axial aberration of an optical system or other reasons. Correction of a blur means correcting the difference in MTF (Modulation Transfer Function: optical transfer function) characteristics between G and R or B.

<D. Related Image Processing Method>

In order to facilitate understanding of the image processing method according to the present embodiment, an image processing method related to the present invention will be described.

Figure 5:
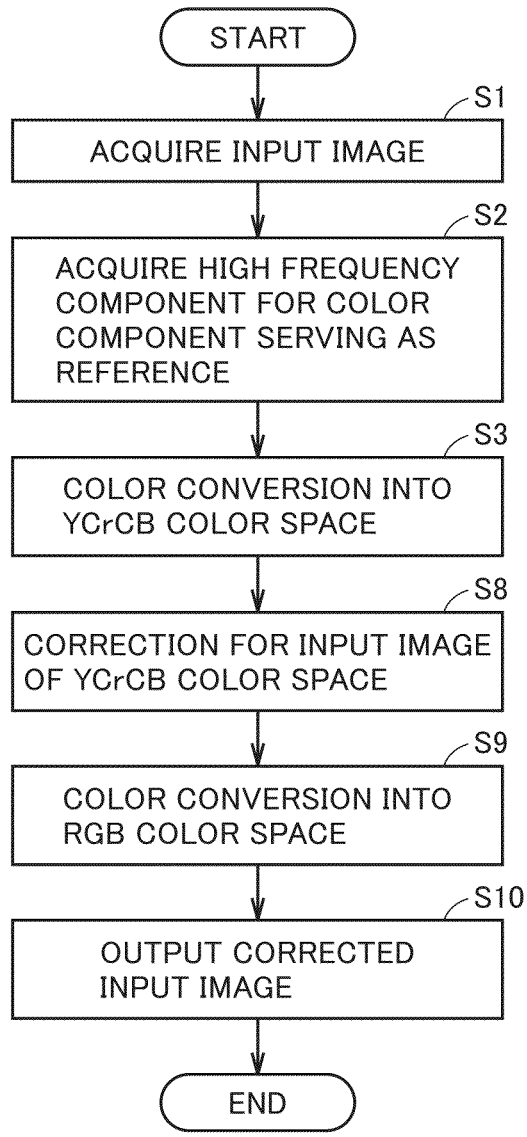
FIG. 5 is a flowchart showing the procedure of an image processing method related to the present invention.

FIG. 5 is a flowchart showing the procedure of the image processing method related to the present invention. In the image processing method related to the present invention (hereinafter also simply referred to as "related art"), a blur is corrected by substituting the high frequency component of G included in the input image for the high frequency component of Y (luminance).

More specifically, referring to FIG. 5, first, the process of acquiring an input image (step S1) is performed. This input image is constituted with pixels each defined by three-dimensional grayscale values including an R grayscale value, a G grayscale value, and a B grayscale value. Then, the process of acquiring a high frequency component (step S2) is performed for the color component serving as a reference (typically, G) among the color components (R, G, B) included in the acquired input image.

Next, the process of converting the RGB color space of the input image into the YCrCB color space is performed (step S3). Then, a correction process is performed on the input image of the YCrCB color space acquired in step S3, using the high frequency component for the color component serving as a reference that is acquired in step S2 (step S8). The process of reconverting the corrected input image (YCrCB color space) in step S8 into the RGB color space is then performed (step S9). The corrected image obtained through this process is output (step S10). The process then ends.

(d1: Acquisition of Input Image (step S1))

Figure 6:
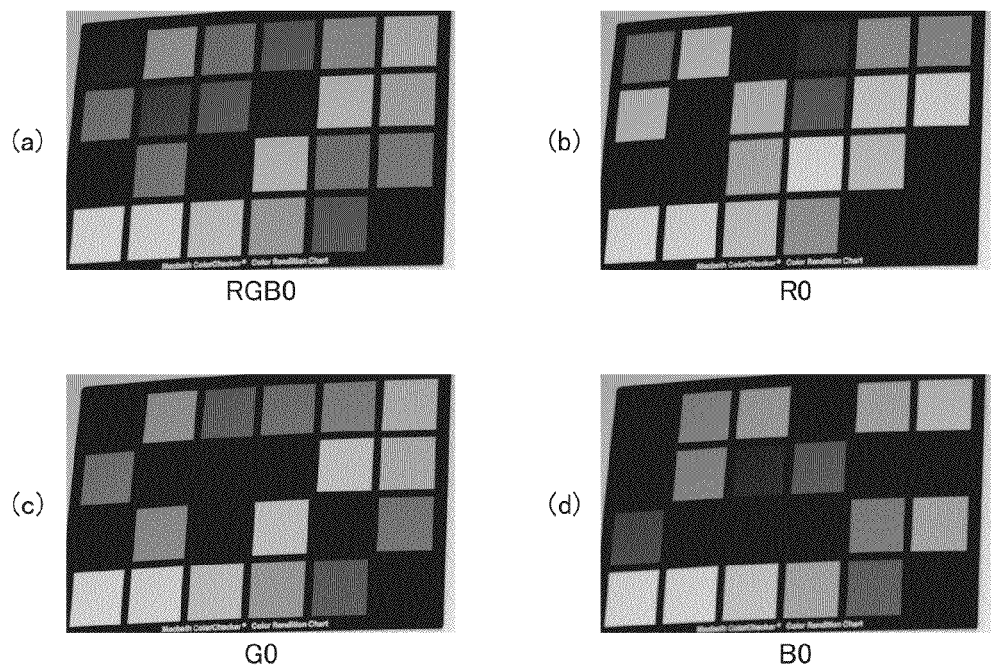
FIG. 6 is a diagram showing an example of an input image to be processed by the image processing method related to the present invention.

The image processing apparatus acquires an input image, for example, by imaging a subject with a camera. FIG. 6 is a diagram showing an example of an input image to be processed by the image processing method related to the present invention.

FIG. 6 (a) shows an example of an input image (RGB0) represented in the RGB color space, and FIGS. 6 (b), (c), (d) show examples of grayscale images of R, G, B (R0, G0, B0), respectively.

FIG. 6 shows an image having a size of 750×500 pixels, by way of example.

(d2: Acquisition of High Frequency Component (step S2))

The image processing apparatus acquires a high frequency component for a color component serving as a reference (typically, G) among the color components (R, G, B) included in the input image to be processed. Specifically, a low frequency component is extracted by passing the input image through an LPF (Low Path Filter), and a high frequency component is extracted by subtracting the extracted low frequency component from the input image.

The wavelength range of the high frequency component used for the correction can be defined in advance. Such a wavelength range can be set in a frequency band having the MTF characteristic degraded compared with the MTF characteristic of the color component as a reference among the MTF characteristics of the color component to be corrected. That is, by making a comparison between at least two colors, the frequency band having the poorer MTF characteristic can be set as the high frequency component to be corrected.

Figure 7:
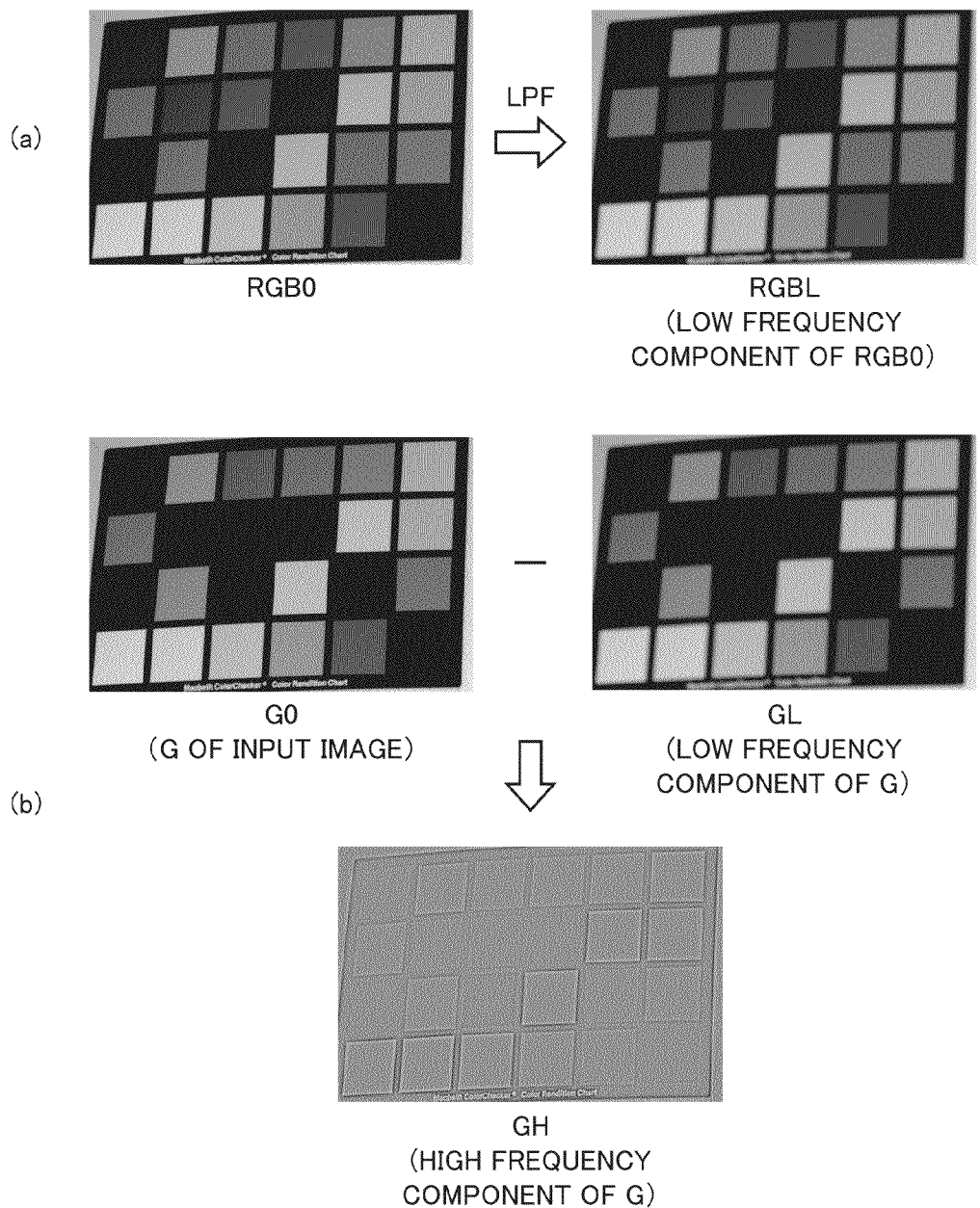
FIG. 7 is a diagram for explaining the process of extracting a high frequency component in the image processing method related to the present invention.
Figure 8:
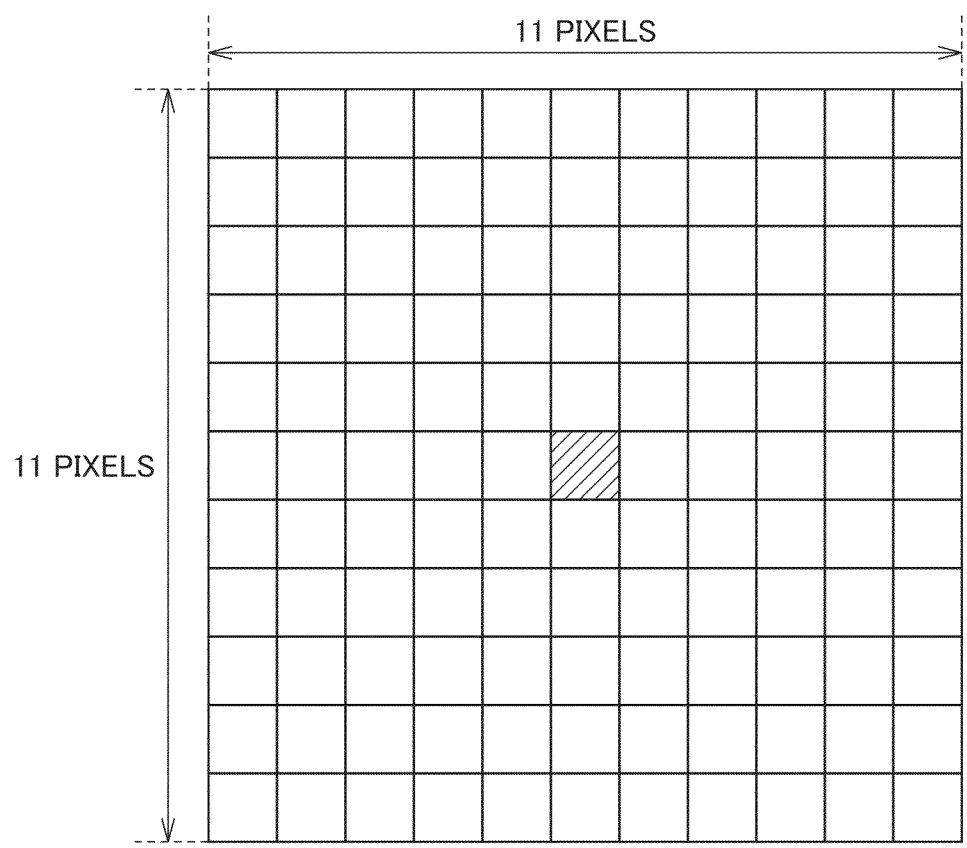
FIG. 8 is a diagram showing an example of an LPF.

FIG. 7 is a diagram for explaining the process of extracting a high frequency component in the image processing method related to the present invention. FIG. 8 is a diagram showing an example of an LPF.

Referring to FIG. 7(a), first, the image processing apparatus passes the input image (RGB0) through an LPF. For example, the averaging filter of 11 pixels×11 pixels as shown in FIG. 8 can be employed as the LPF. The LPF may have a filter size changed depending on the conditions such as the frequency to be extracted or the image size or may be of the type using weighted average, such as a Gaussian filter.

The low frequency component (RGBL) of the input image as shown in FIG. 7(a) is acquired through this LPF processing. Although FIG. 7(a) shows the low frequency component (RGBL) of the input image (RGB0) represented in the RGB color space, for convenience of explanation, only the grayscale image of the target color (in this example, G) may be passed through the LPF.

Next, as shown in FIG. 7 (b), the high frequency component of G (GH) of the input image is acquired by subtracting the low frequency component of G (GL) from G (G0) of the input image. That is, the high frequency component of G is taken out from the input image.

(d3: Color Conversion into YCrCB Color Space (step S3))

The image processing apparatus converts each of the input images of the RGB color space and the low frequency component thereof into the YCrCb color space for the subsequent correction process.

Figure 9:
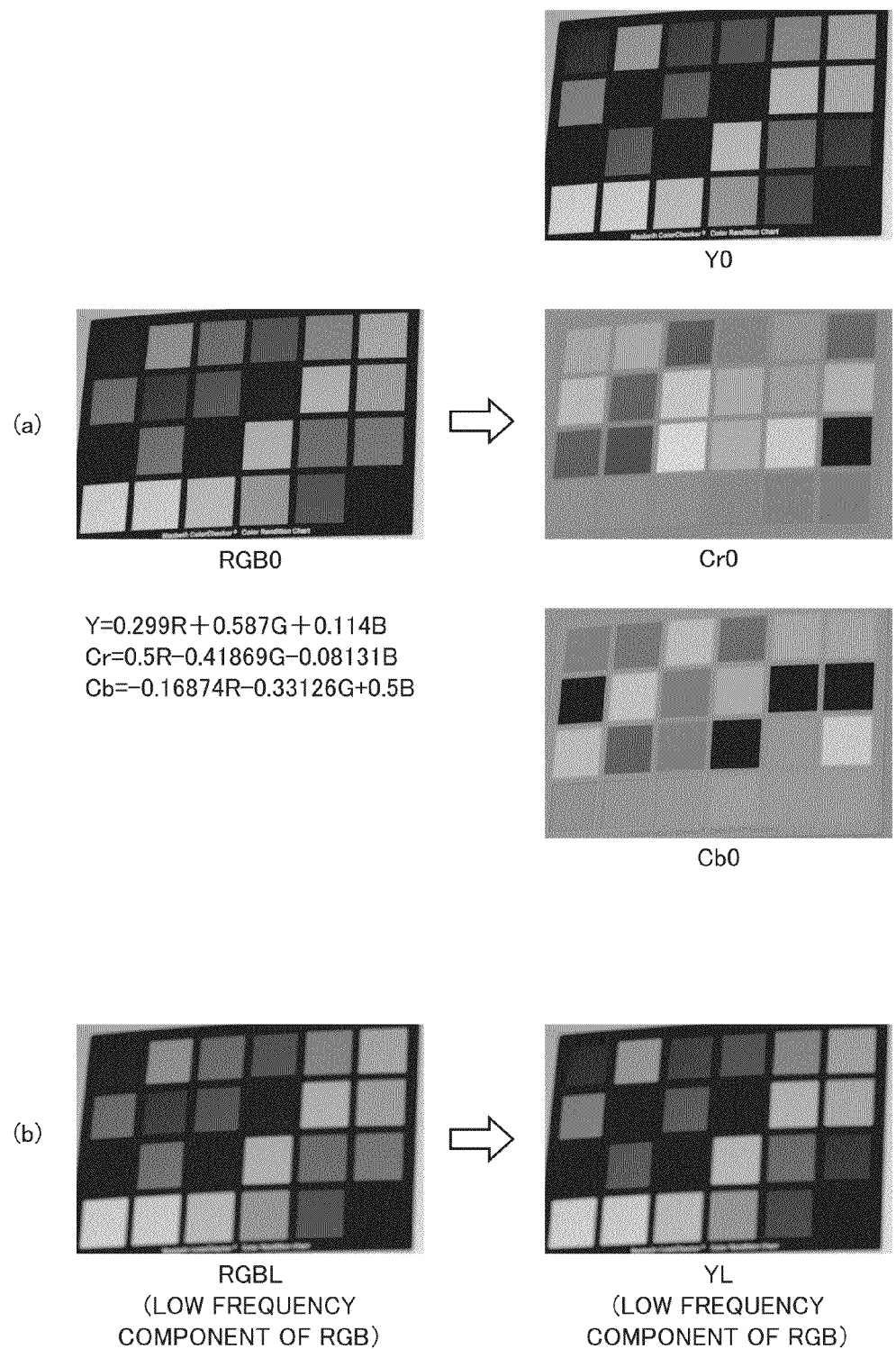
FIG. 9 is a diagram for explaining the process of conversion to the YCrCb color space in the image processing method related to the present invention.

FIG. 9 is a diagram for explaining the process of conversion to the YCrCb color space in the image processing method related to the present invention. As shown in FIG. 9(a), the input image (RGB0) of the RGB color space is converted into the YCrCb color space. As a result of this color conversion process, a luminance component (Y0) and two hue components (Cr0, Cb0) are generated.

As shown in FIG. 9 (b), the low frequency component (RGBL) of the input image is also converted into the YCrCb color space. Although a luminance component (YL) and two hue components are generated through this color conversion process, the other components are not shown in the figure, because only the luminance component (YL) of the low frequency component (RGBL) is required in the subsequent process.

(d4: Correction Process for Input Image of YCrCB Color Space (step S8))

Next, the image processing apparatus performs a correction process on the input image of the YCrCB color space. Specifically, the image processing apparatus transports the high frequency component of G (GH) of the input image to Y (luminance) of the input image.

Figure 10:
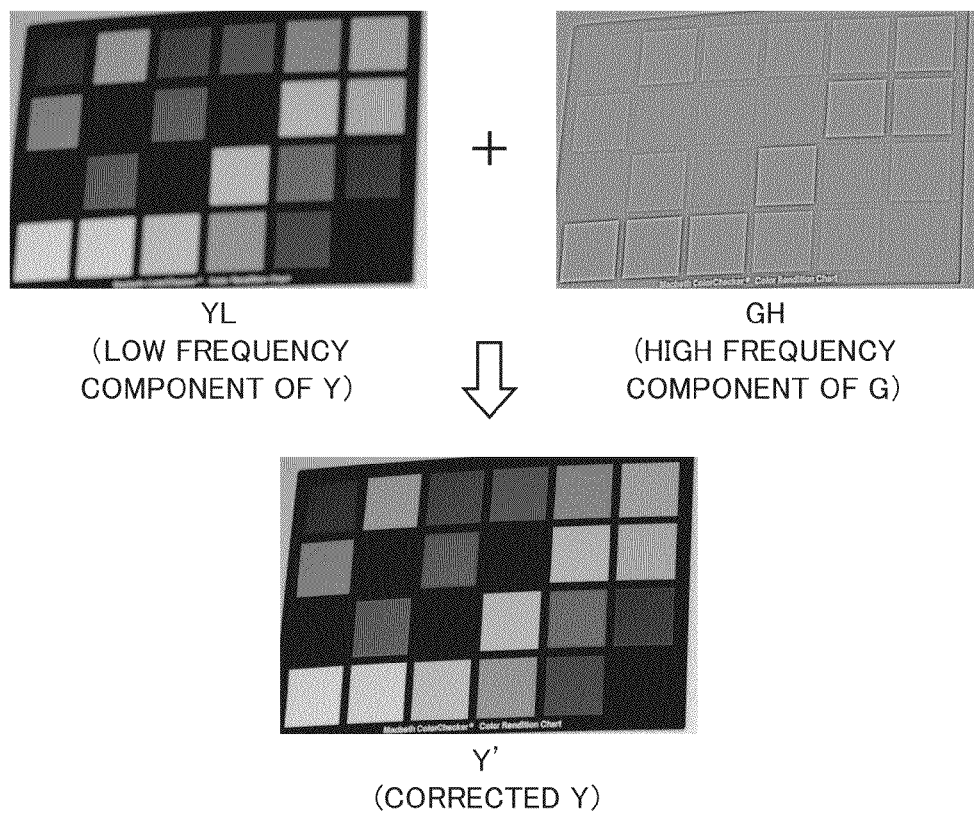
FIG. 10 is a diagram for explaining the correction process for an input image in the image processing method related to the present invention.

FIG. 10 is a diagram for explaining the correction process for an input image in the image processing method related to the present invention. FIG. 11 is a diagram for explaining the effect by the correction process for an input image in the image processing method related to the present invention.

As shown in FIG. 10, the image processing apparatus substitutes the high frequency component of G (GH) of the input image for the high frequency component of Y (luminance) of the input image to correct Y (luminance) of the input image. In order to replace the high frequency component of Y (luminance) of the input image, the high frequency component (GH) of G of the input image is added to the low frequency component (YL) obtained by removing the high frequency component from Y (luminance) of the input image, thereby generating corrected Y (Y') that is the corrected luminance of the input image.

As can be understood from comparison between FIG. 11(a) and FIG. 11(b), when compared with the original Y (luminance) of the input image, the edge is corrected to be sharp, for example, at the character portion and the boundary of a patch as a result of the correction process for the input image described above.

(d5: Color Conversion into RGB Color Space (step S9))

In the final step, the image processing apparatus converts the YCrCb color space into the RGB color space using the corrected Y (Y') to generate a corrected RGB image.

FIG. 12 is a diagram for explaining the process of color conversion to the RGB color space in the image processing method related to the present invention. As shown in FIG. 12(a) and FIG. 12(b), the image processing apparatus generates corrected R and B by adding the corrected Y (Y') and the original Cr and Cb, respectively. It is noted that G is originally the color component serving as a reference and does not require correction and, therefore, the original value of the input image is used as it is.

(d6: Correction Result by Related Art)

FIG. 13 is a diagram showing an example of the correction result in accordance with the image processing method related to the present invention. FIG. 14 is an enlarged view of the correction result shown in FIG. 13.

FIG. 13 shows an image obtained as a result of correction of the input image by the related art. The corrected image shown in FIG. 13 seems to be mostly sharpened. However, as shown in FIG. 14, when the corrected image is partially enlarged, it is understood that the red patch portion is blurred on the contrary although the high frequency component has been corrected. This is caused because the R component is blurred due to the correction, as shown in the middle section in FIG. 14.

<E. Means for Solving in the Present Embodiment>

The inventor of the subject application has found that the problem as shown in FIG. 14 occurs in the related art described above and has made a new finding for the cause. The inventor of the subject application then has conceived the technical idea of the subject application based on the new finding. These will be described below.

Figure 15:
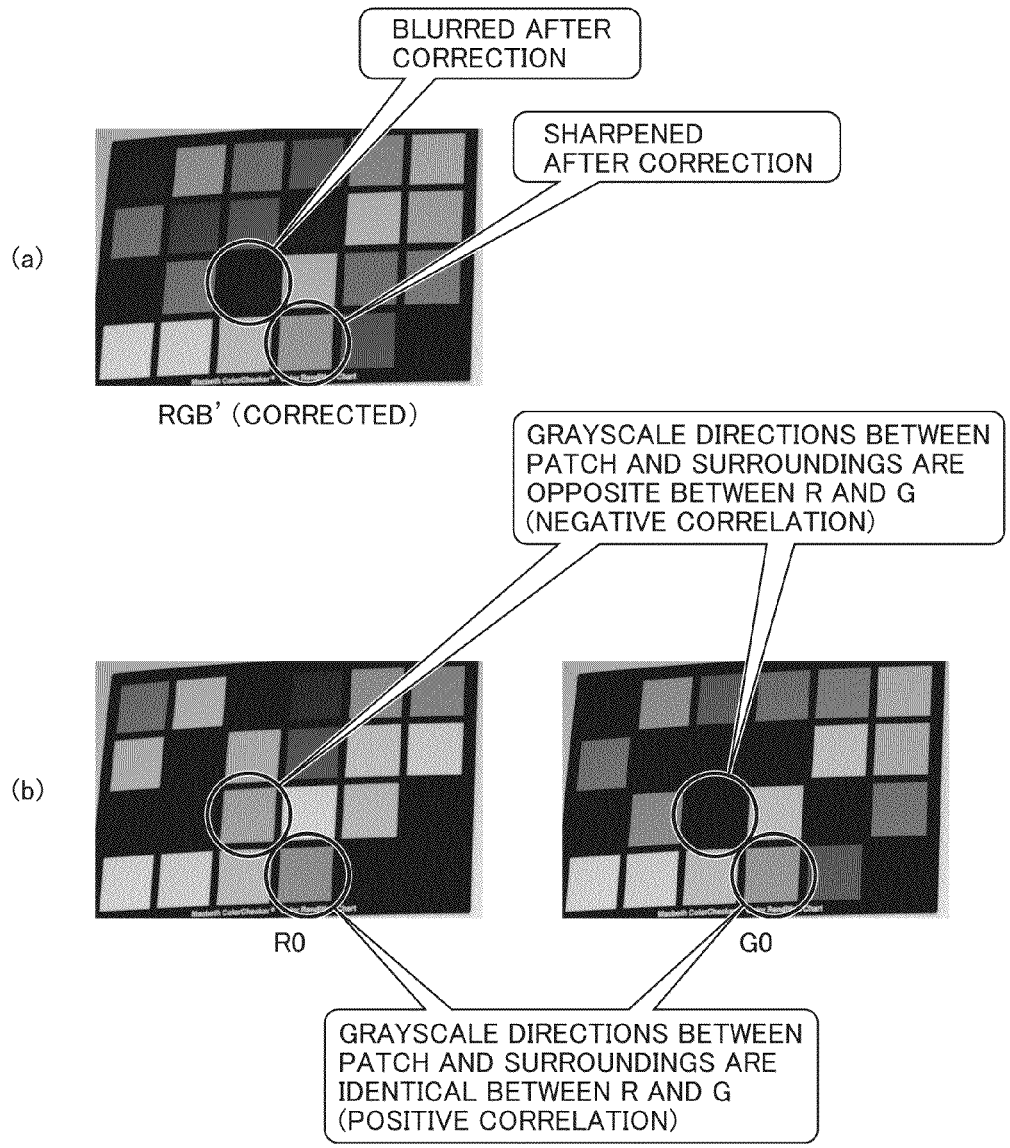
FIG. 15 is a diagram for explaining the problem caused by the correction by the image processing method related to the present invention.
Figure 17:
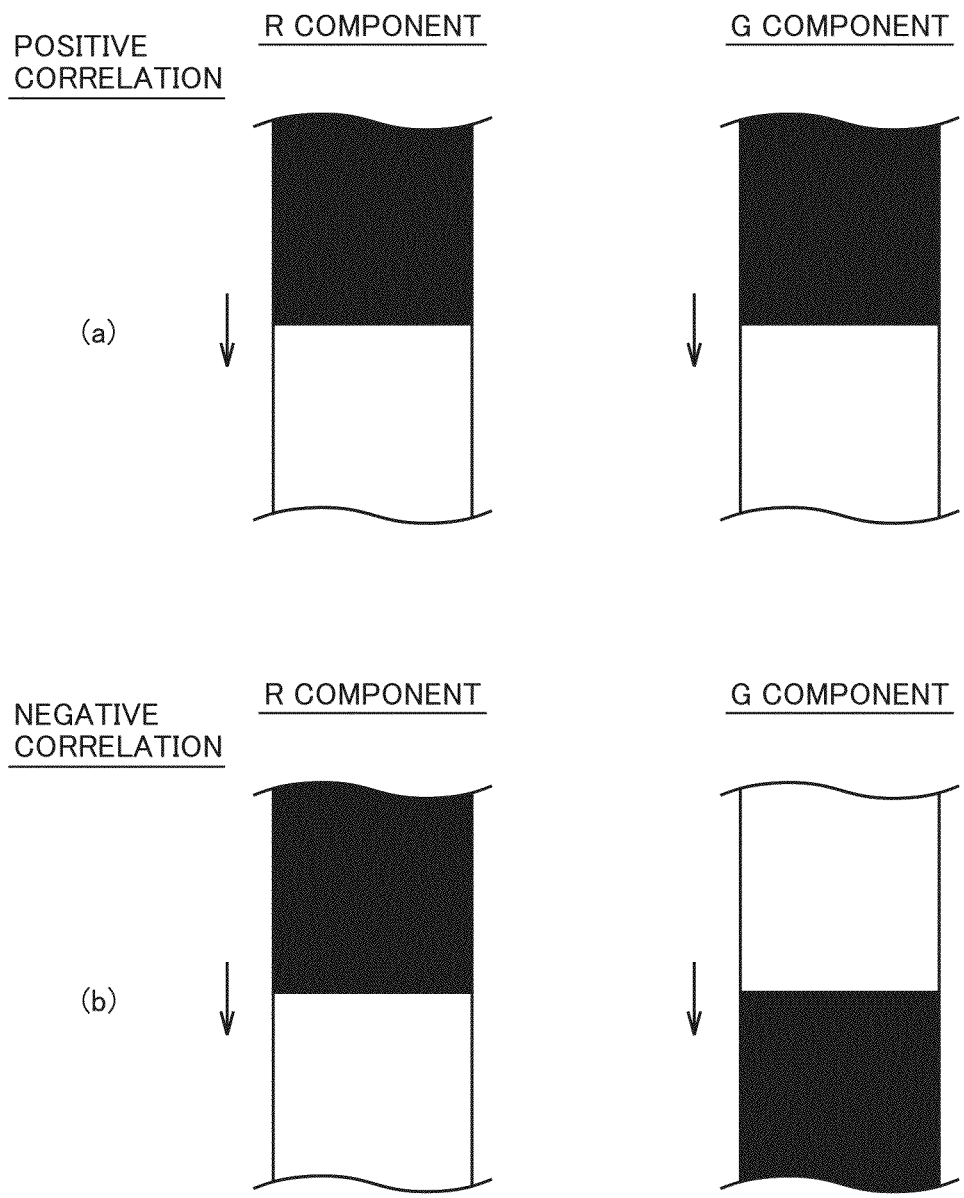
FIG. 17 is a diagram for explaining grayscale direction correlation employed in an embodiment of the present invention.

FIG. 15 and FIG. 16 are diagrams for explaining the problem caused by the correction by the image processing method related to the present invention. FIG. 17 is a diagram for explaining a grayscale direction correlation employed in an embodiment of the present invention.

As shown in FIG. 15(a), in the corrected image (RGB') obtained as a result of the correction by the related art, the gray patch portion is sharpened as a result of the correction (blur is eliminated), whereas the degree of the blur is increased by the correction in the red patch portion.

As shown in FIG. 15(b), in the R component and the G component of the input image, the patch portion and the surrounding portion are compared for each color.

First, as for gray, the inside of the patch portion is light while the surrounding portion is dark in both of the R component and the G component, and the relation of grayscale change is the same. By contrast, as for red, the inside of the patch portion is dark while the surrounding portion is light in the R component, and the inside of the patch portion is light while the surrounding portion is dark in the G component. That is, as for red, the relation of grayscale change between the patch portion and the surroundings is reversed between the R component and the G component.

In the present embodiment, the relation of grayscale change between different color components in the same range of the input image is referred to as "grayscale direction correlation". The state as in the gray described above in which the grayscale change is identical or similar between different color components is referred to as a "positive correlation", and the state as in the red described above in which grayscale change is different or opposite between different color components is referred to as a "negative correlation". That is, the solution means according to the present embodiment includes a process of calculating the grayscale direction correlation indicating that the grayscale directions of the first color component and the second color component are identical or opposite for a region of interest in the input image.

As shown in FIG. 16(a), when the "grayscale direction correlation" is high, that is, a "positive correlation" holds between color components, the correction acts so as to enhance the edge to achieve sharpness. By contrast, as shown in FIG. 16(b), when the "grayscale direction correlation" is low, that is, a "negative correlation" holds between color components, the correction dulls the edge on the contrary.

The conceptual diagrams of a positive correlation and a negative correlation in connection with the grayscale direction correlation are shown in FIG. 17. As shown in FIG. 17(a), when the corresponding part changes from a dark state to a light state both in the R component and the G component, a positive correlation holds. By contrast, as shown in FIG. 17(b), when the corresponding part changes from a dark state to a light state in the R component while the corresponding part changes from a light state to a dark state in the G component, a negative correlation holds.

In the present embodiment, such a grayscale direction correlation is used to appropriately correct the high frequency component used in correction so that correction does not cause a blur. That is, the image processing method according to the present embodiment is directed to the problem that is caused by the method in which the high frequency component is substituted for the high frequency component of other color components (channels). In the related art described above, the use of the high frequency component of G of the input image for the high frequency component of Y (luminance) is equivalent to substitution of G for R.

<F. First Embodiment>

Next, a first embodiment using the solution means as described above will be described. Also in the image processing method according to the first embodiment, it is assumed that the high frequency component of G included in the input image is substituted for the high frequency component of Y (luminance), by way of example.

The image processing apparatus according to the first embodiment of the present invention has the function of acquiring an input image represented with a plurality of color components, the function of calculating a grayscale direction correlation indicating that whether the grayscale directions of the first color component (typically, G) and the second color component (typically, R) are identical or opposite for the region of interest in the input image, and the function of calculating the high frequency component of the first color component for the region of interest. The image processing apparatus then corrects the color component to be corrected for the region of interest using the high frequency component in accordance with the method depending on the calculated grayscale direction correlation. That is, the image processing apparatus corrects the second color component for the region of interest, in accordance with the method depending on the grayscale direction correlation calculated by the correlation calculation unit, using the high frequency component of the first color component calculated by the high frequency component calculation unit. That is, the image processing apparatus according to the present first embodiment calculates the grayscale direction correlation between at least two colors and corrects a blur by switching the ways the high frequency component is used for each region.

(f1: Overall Procedure)

Figure 18:
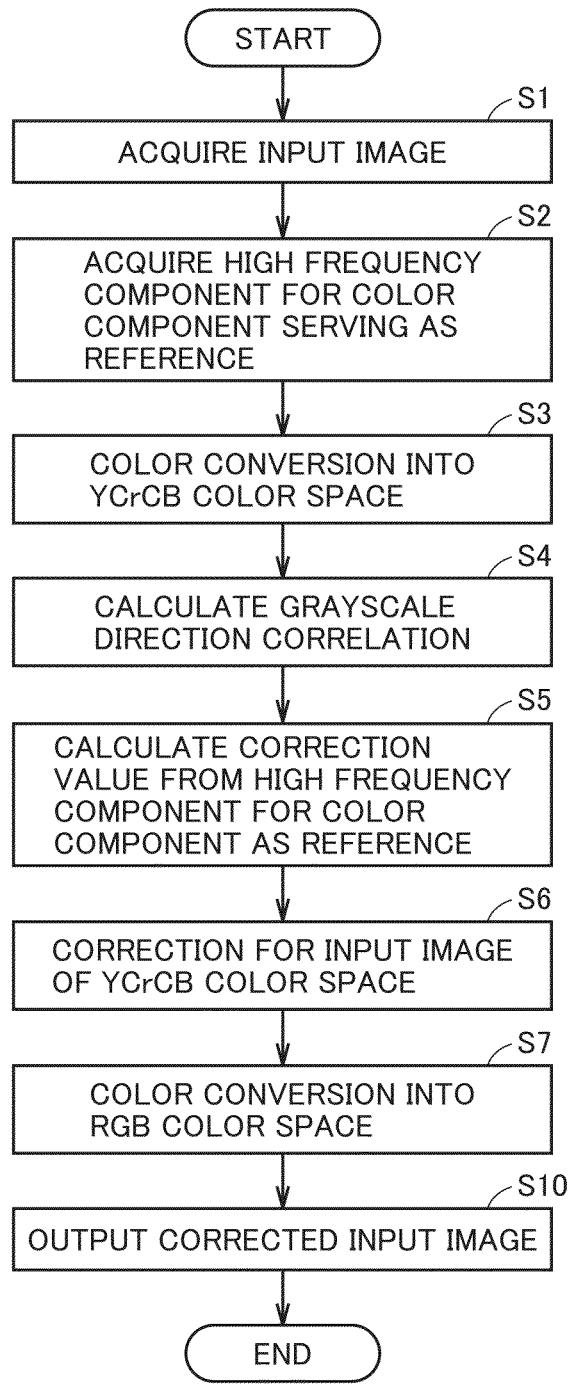
FIG. 18 is a flowchart showing the procedure of the image processing method according to a first embodiment of the present invention.

FIG. 18 is a flowchart showing the procedure of the image processing method according to the first embodiment of the present invention. Referring to FIG. 18, first, the process of acquiring an input image (step S1) is performed. The process of acquiring the high frequency component for the color component as a reference (typically, G) among the color components (R, G, B) included in the acquired input image (step S2) is then performed. The process of converting the RGB color space of the input image into the YCrCB color space is further performed (step S3). The processes in steps S1 to S3 are the same as the processes in steps S1 to S3 shown in FIG. 5.

The process of calculating a grayscale direction correlation (step S4) is then performed. The process of calculating a correction value from the high frequency component of the color component as a reference (typically, G) (step S5) is then performed. The correction process is then performed on the input image of the YCrCB color space acquired in step S3 using the high frequency component for the color component as a reference that is calculated in step S5 (step S6). The process of reconverting the input image (YCrCB color space) corrected in step S6 into the RGB color space is then performed (step S7). The corrected image obtained through this process is output (step S10). The process then ends.

The details of the processes in steps S4 to S7 shown in FIG. 18 will be mainly described below. The processes in steps S1 to S3 and S10 are the same as the processes described in the foregoing related art and a detailed description thereof will not be repeated.

(f2: Calculation of Grayscale Direction Correlation (step S4))

Next, the details of the process of calculating a grayscale direction correlation will be described.

Figure 19:
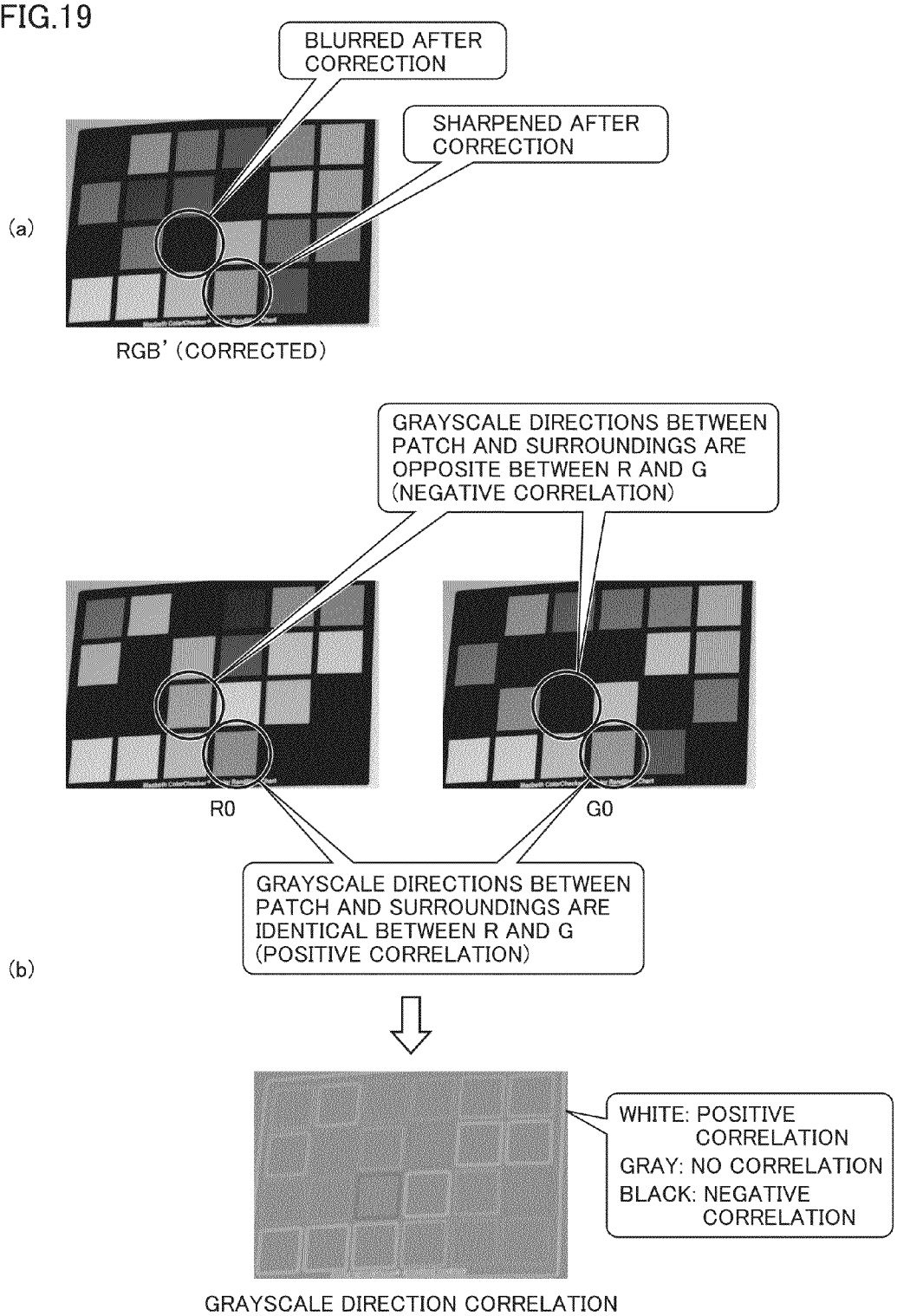
FIG. 19 is a diagram showing the overview of grayscale direction correlation in the image processing method according to the first embodiment of the present invention.
Figure 21:
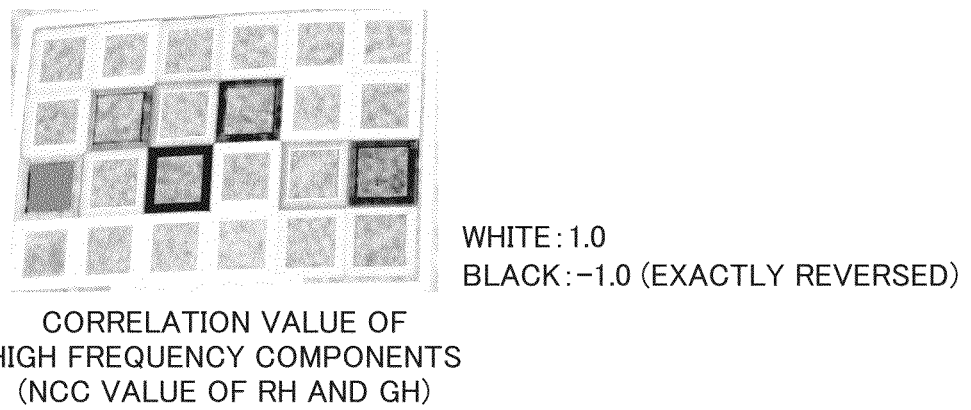
FIG. 21 is a diagram showing a step in the process of calculating the grayscale direction correlation in the image processing method according to the first embodiment of the present invention.
Figure 22:
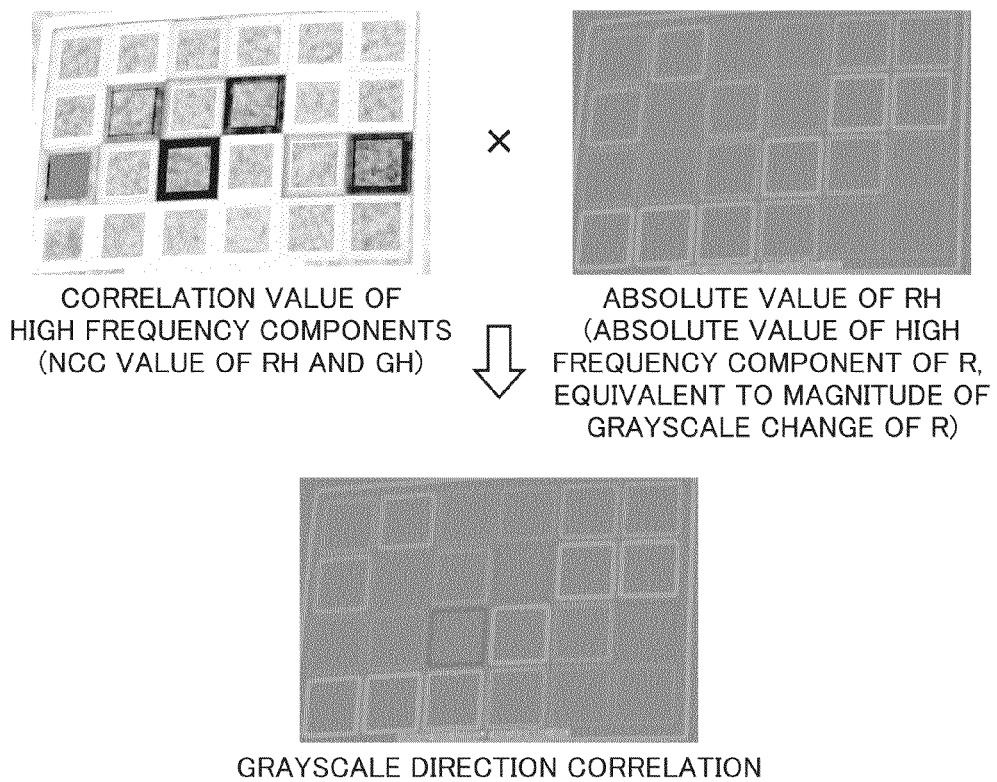
FIG. 22 is a diagram showing an example of the calculation result of the grayscale direction correlation in the image processing method according to the first embodiment of the present invention.

FIG. 19 is a diagram showing the overview of grayscale direction correlation in the image processing method according to the first embodiment of the present invention. FIG. 20 and FIG. 21 are diagrams showing a step in the process of calculating a grayscale direction correlation in the image processing method according to the first embodiment of the present invention. FIG. 22 is a diagram showing an example of the calculation result of the grayscale direction correlation in the image processing method according to the first embodiment of the present invention.

In step S4 in FIG. 18, as shown in FIG. 19(a), a grayscale direction correlation is calculated in order to avoid occurrence of a region having a blur due to correction. Here, it is assumed that the grayscale direction correlation for R of the input image is calculated.

As described above, in the present embodiment, the "grayscale direction correlation" is data in which whether the edge (a portion having a large grayscale change) has a positive correlation or a negative correlation can be determined, as shown in FIG. 19(b). In FIG. 19(b), the grayscale direction correlation is represented as a two-dimensional image. In this grayscale direction correlation, a "white" portion is an edge that has a larger positive value as data as the positive correlation is higher. On the other hand, a "black" portion is an edge that has a larger negative value as data as the negative correlation is higher. A "gray" portion is a non-edge portion or an edge portion with little correlation and has a value in the vicinity of zero as data.

Referring to FIG. 20 to FIG. 22, the details of the process of calculating a grayscale direction correlation will be described below. First, as shown in FIG. 20, image processing apparatus 1 calculates the high frequency components of R and G (RH and GH) of the input image. The calculation method of the high frequency component has been described with reference to FIG. 7 and FIG. 8, and the details will not be repeated.

Next, image processing apparatus 1 calculates a correlation value between the high frequency component of R (RH) and the high frequency component of G (GH). That is, image processing apparatus 1 calculates a grayscale direction correlation using the high frequency components of two colors. Here, the grayscale direction correlation is calculated using a correlation value obtained by pattern-matching of the high frequency components of two colors.

In the present embodiment, for example, for the high frequency component of R (RH) and the high frequency component of G (GH), an NCC value is calculated as a correlation value of the high frequency components, using the NCC (Normalized Cross Correlation) method. Here, the NCC method is a kind of pattern matching.

Here, an NCC value is calculated according to Expression (1) below for the size of 11 pixels×11 pixels, in the same manner as in the LPF shown in FIG. 8.

$$NCC = \frac{\sum_{j=-5}^{5}\sum_{i=-5}^{5} RH(i,j) \cdot GH(i,j)}{\sqrt{\sum_{j=-5}^{5}\sum_{i=-5}^{5} RH(i,j)^2 \times \sum_{j=-5}^{5}\sum_{i=-5}^{5} GH(i,j)^2}} \tag{1}$$

The resulting NCC value for the high frequency components (RH and GH) shown in FIG. 20 is shown in FIG. 21. In the resulting NCC value shown in FIG. 21, the portion where the grayscale directions are similar is whitish and indicates a value close to 1.0, and conversely, the portion where the grayscale directions are different is blackish and indicates a value close to −1.0.

In place of processing all of 11 pixels×11 pixels as shown in Expression (1) above, the processing may be simplified for speeding up, for example, by performing a calculation every two pixels. The processed size may not be the same as the size of the LPF, and the filter size may be adjusted so as to appropriately calculate a correlation for grayscale of the target edge.

As described above, the image processing apparatus according to the present embodiment calculates a grayscale direction correlation based on the high frequency components included in the color component as a reference (typically, G) and the color component to be corrected (typically, R). More specifically, the image processing apparatus according to the present embodiment calculates the grayscale direction correlation by the NCC method.

Since the correlation value of the high frequency components (the resulting NCC value) shown in FIG. 21 does not include information indicating an edge or not (that is, whether the grayscale change is large), the grayscale direction correlation is calculated by multiplying the absolute value of RH.

More specifically, as shown in FIG. 22, the process of multiplying "the correlation value of the high frequency components" by the "absolute value of RH" (information indicating an edge of R or not (whether the grayscale change is large)) for each pixel is performed. More specifically, the image processing apparatus calculates a grayscale direction correlation by multiplying the correlation value of the high frequency components by the absolute value of RH, according to Expression (2) below.

$$\text{Grayscale direction correlation} = NCC \times |RH| \quad (2)$$

Here, the absolute value of RH is used since how the edge of R is correlated to the edge of G is calculated. That is, the absolute value of the high frequency component of R is equivalent to the magnitude of grayscale change of R.

As described above, the image processing apparatus according to the present embodiment calculates a grayscale direction correlation by multiplying the correlation value by the magnitude of grayscale change of the second color component (typically, R).

(f3: Calculation of Correction Value from High Frequency Component (step S5))

Next, the process of calculating a correction value from the high frequency component for the color component as a reference (typically, G) (step S5) is performed.

Figure 24:
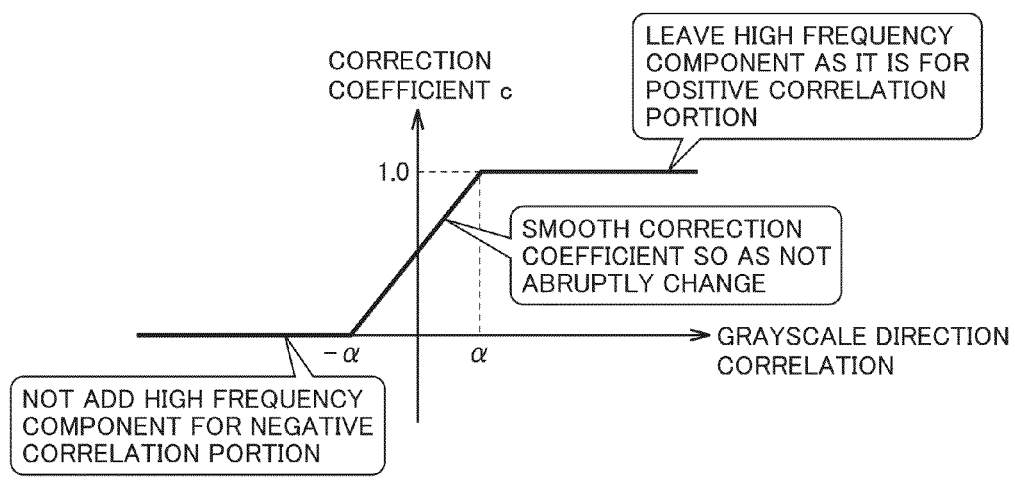
FIG. 24 is a diagram showing an example of a correction coefficient for calculating a high frequency component for correction according to the first embodiment of the present invention.

FIG. 23 is a diagram showing the process for calculating a high frequency component for correction according to the first embodiment of the present invention. FIG. 24 is a diagram showing an example of a correction coefficient for calculating a high frequency component for correction according to the first embodiment of the present invention.

Once the grayscale direction correlation as shown in FIG. 23(a) is calculated, the high frequency component of G (GHred) for correcting R of the input image is calculated using the calculated grayscale direction correlation. More specifically, the high frequency component of G (GHred) for correcting R of the input image is generated by correcting the high frequency component of G (GH) so as to leave the high frequency component in the portion of the high frequency component of G (GH) of the input image as shown in FIG. 23(b) that has a positive correlation and not to add the high frequency component in the portion that has a negative correlation. The high frequency component of G (GHred) is generated through calculation according to Expression (3) below using the correction coefficient c as shown in FIG. 24.

$$GHred = GH \times c \quad (3)$$

As for the correction coefficient c shown in FIG. 24, in the portion having a positive correlation, if the grayscale direction correlation exceeds $\alpha$ ($\alpha > 0$), the correction coefficient c=1 is applied in order to leave the high frequency component of G as it is. On the other hand, in the portion having a negative correlation, if the grayscale direction correlation falls below $-\alpha$, the correction coefficient c=0 is applied in order not to add the high frequency component of G. In order to avoid a steep change between the positive correlation and the negative correlation, if the grayscale direction correlation falls within a range from $-\alpha$ to $\alpha$, the correction coefficient is set to a linear function for the grayscale direction correlation so as to smooth changes of the correction coefficient. Although here the values $-\alpha$ and a having the same absolute value are used as the thresholds of the grayscale direction correlation, the threshold of the negative correlation is not limited to $-\alpha$, and $\beta$ of any value ($\beta < 0$) may be used.

That is, in the correction process according to the present embodiment, when the grayscale direction correlation for the region of interest indicates a positive correlation in which the grayscale directions of the first color component and the second color component are identical, the high frequency component of the first color component is added to the second color component, and when the grayscale direction correlation for the region of interest indicates a negative correlation in which the grayscale directions of the first color component and the second color component are opposite, the correction of the second color component by the high frequency component of the first color component is not performed.

More specifically, in the correction process according to the present embodiment, when the grayscale direction correlation for the region of interest exceeds a predetermined value $\alpha$ ($\alpha > 0$), the grayscale direction correlation for the region of interest is determined to be a positive correlation. When the grayscale direction correlation of the region of interest falls below a predetermined value $\beta$ ($\beta < 0$), the grayscale direction correlation of the region of interest is determined to be a negative correlation. When the grayscale direction correlation for the region of interest falls within a range from the predetermined value $\alpha$ to the predetermined value $\beta$, the high frequency component of the first color component reduced compared with the case of a positive correlation is added to the second color component.

(f4: Correction on Input Image (step S6))

Next, the correction process for the input image is performed using the high frequency component of G (GHred) for correcting R of the input image that is calculated through the process as described above.

Figure 25:
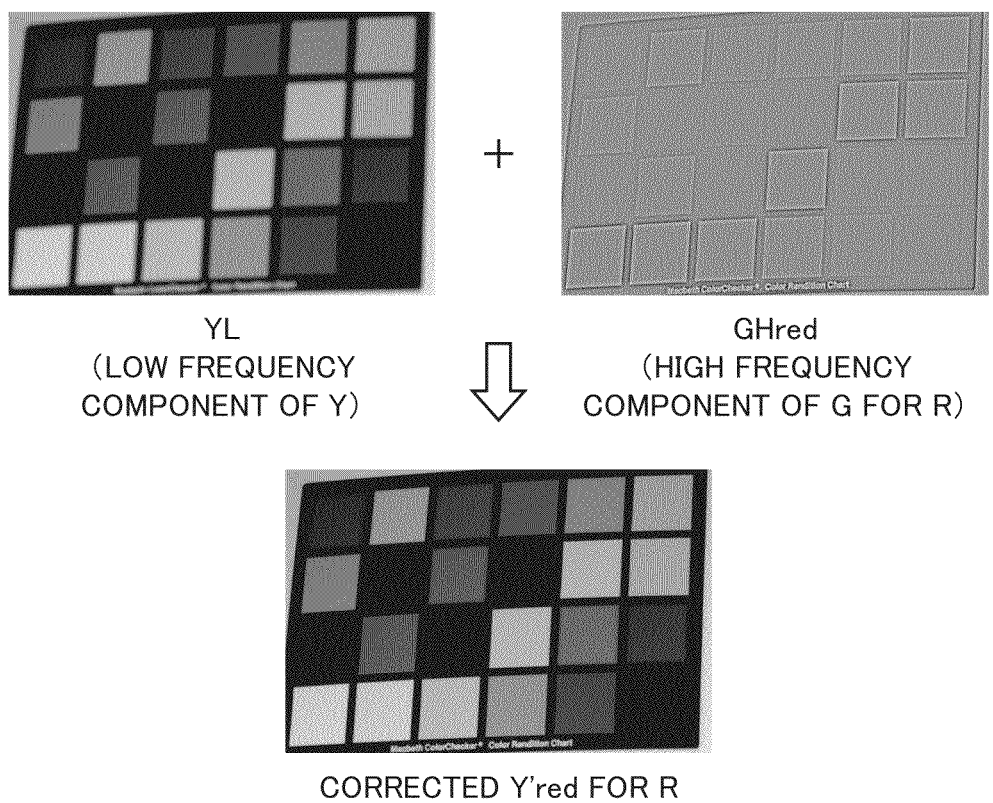
FIG. 25 is a diagram for explaining the correction process for an input image in the image processing method according to the first embodiment of the present invention.
Figure 26:
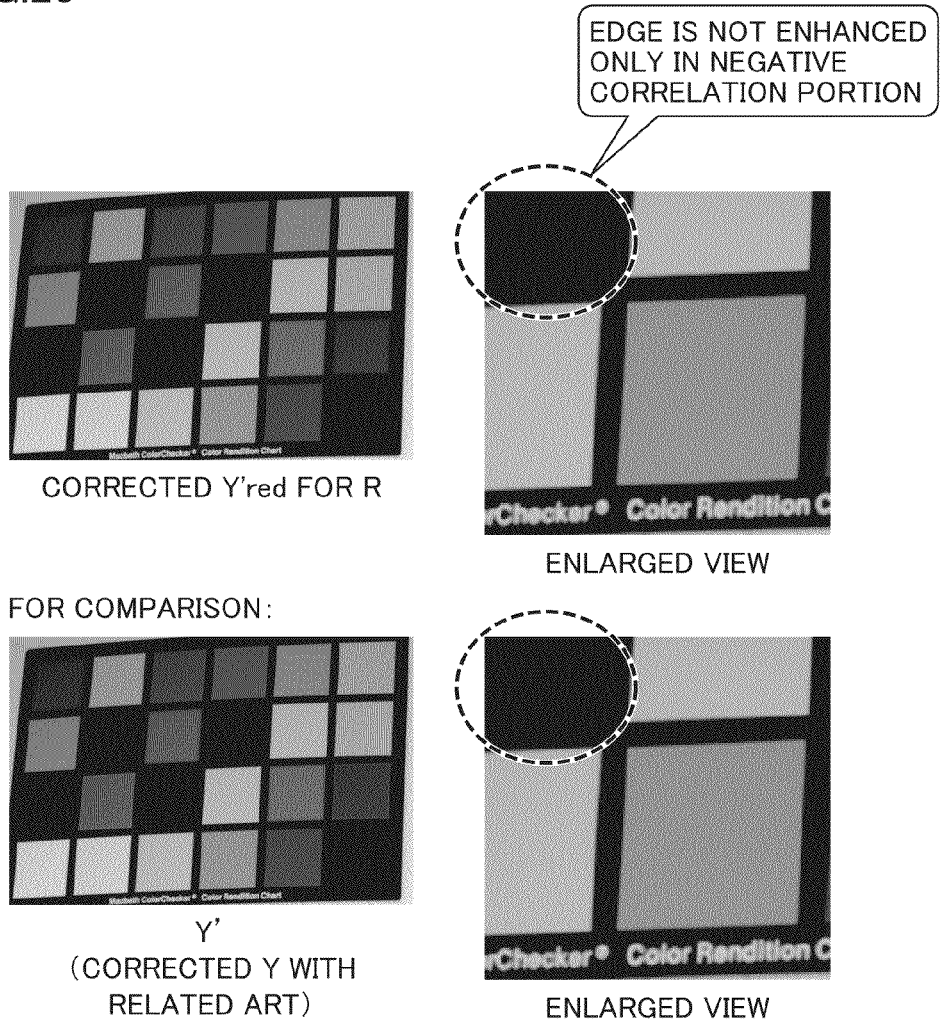
FIG. 26 is a diagram for explaining the effect of correction by the correction process for an input image shown in FIG. 25.

FIG. 25 is a diagram for explaining the correction process for an input image in the image processing method according to the first embodiment of the present invention. FIG. 26 is a diagram for explaining the effect of correction by the correction process for an input image shown in FIG. 25.

Referring to FIG. 25, the high frequency component of G (GHred) for correcting R of the input image is transported to the luminance of R (Y'red) of the input image. That is, for R of the input image, the corrected luminance for R (Y'red) is calculated using the high frequency component of G (GHred). More specifically, the luminance (Y'red) is calculated by adding the high frequency component of G (GHred) to the low frequency component of the luminance (YL) of the input image.

As shown in FIG. 26, with such a correction method, the edge of the red patch portion having a blur due to the negative correlation as shown in FIG. 15 is not corrected, and the problem as described above does not arise. That is, the edge is not enhanced in the portion having a negative correlation. G of the input image is not corrected because it serves as a reference for correction. By contrast, B of the input image is corrected using the high frequency component of G (GH) in the same manner as in the related art described above.

However, for B of the input image, the grayscale direction correlation is also calculated between G and B of the input image and the high frequency component of G (GHblue) for correcting B of the input image is calculated based on the calculated grayscale direction correlation, in the same manner as in R in the foregoing first embodiment. Correction then may be performed using the calculated high frequency component of G (GHblue). The detail of the procedure has been described above and will not be repeated.

(f5: Conversion into RGB Color Space (step S7))

In the final step, the image processing apparatus generates the corrected RGB image by converting the YCrCb color space back to the RGB color space using the corrected luminance for R (Y'red).

FIG. 27 is a diagram for explaining the process of color conversion into the RGB color space in the image processing method according to the first embodiment of the present invention. As shown in FIG. 27, image processing apparatus 1 generates the corrected R (R") by adding the corrected luminance for R (Y'red) and the original Cr.

G is originally the color component serving as a reference and does not require correction and, therefore, the original value of the input image is used as it is. For B, basically, the corrected B (B') is generated by adding the luminance (Y') and the original Cb through the same procedure as in the related art shown in FIG. 12(b). However, when the high frequency component of G (GHblue) for correcting B of the input image is calculated based on the grayscale direction correlation, the corrected B (B") is generated through the same procedure as in FIG. 27.

(f6: Correction Result by First Embodiment)

Figure 29:
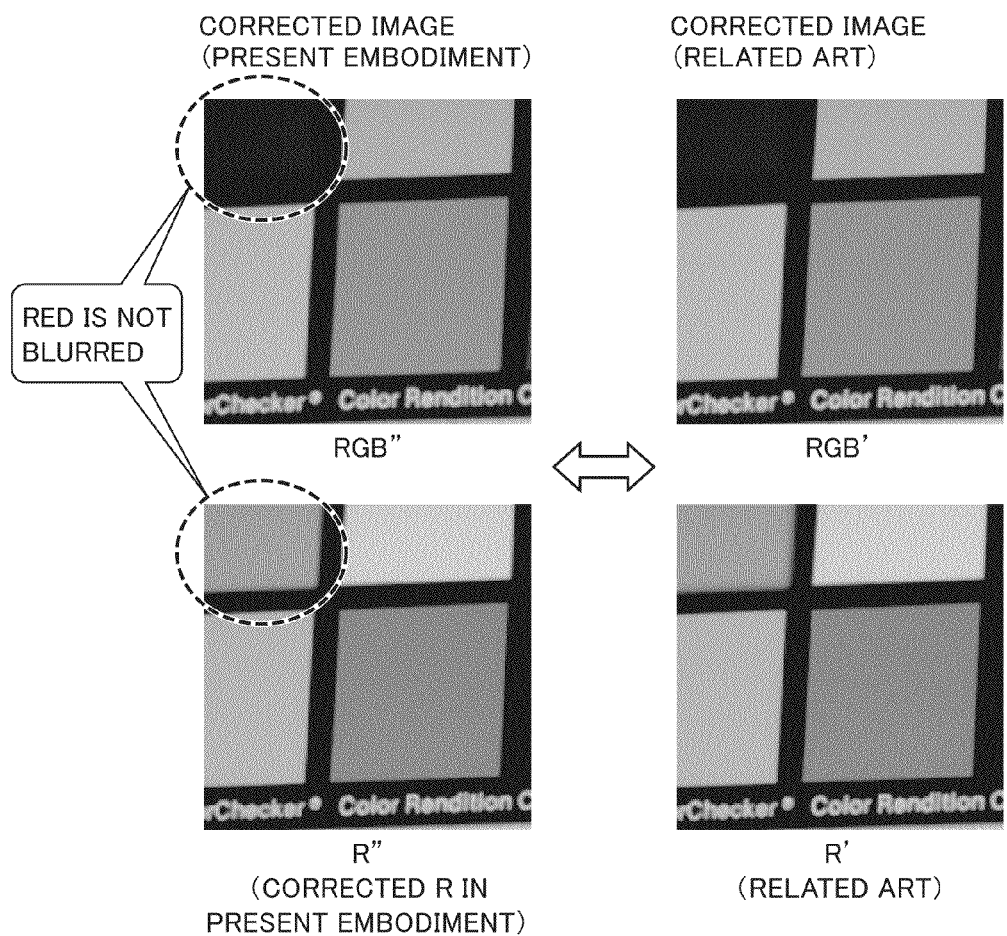
FIG. 29 is an enlarged view of the correction result shown in FIG. 28.

FIG. 28 is a diagram showing an example of the correction result by the image processing method according to the first embodiment of the present invention. FIG. 29 is an enlarged view of the correction result shown in FIG. 28.

As shown in FIG. 28 and FIG. 29, the image processing method according to the present embodiment can prevent a blur for the portion in which a blur occurs (the red patch portion having a negative correlation) in the image processing method according to the related art. That is, it is understood that the image processing method according to the present embodiment can modify the correction so as not to erroneously blur for the region in which correction would cause a problem (the region having a negative correlation).

In the example described above, the image processing method according to the present embodiment is provided for the input image including a plurality of patch portions (artifacts) having a plurality of colors as a subject, for convenience of explanation. However, the same effects can be achieved for a natural input image of a general subject.

Figure 30:
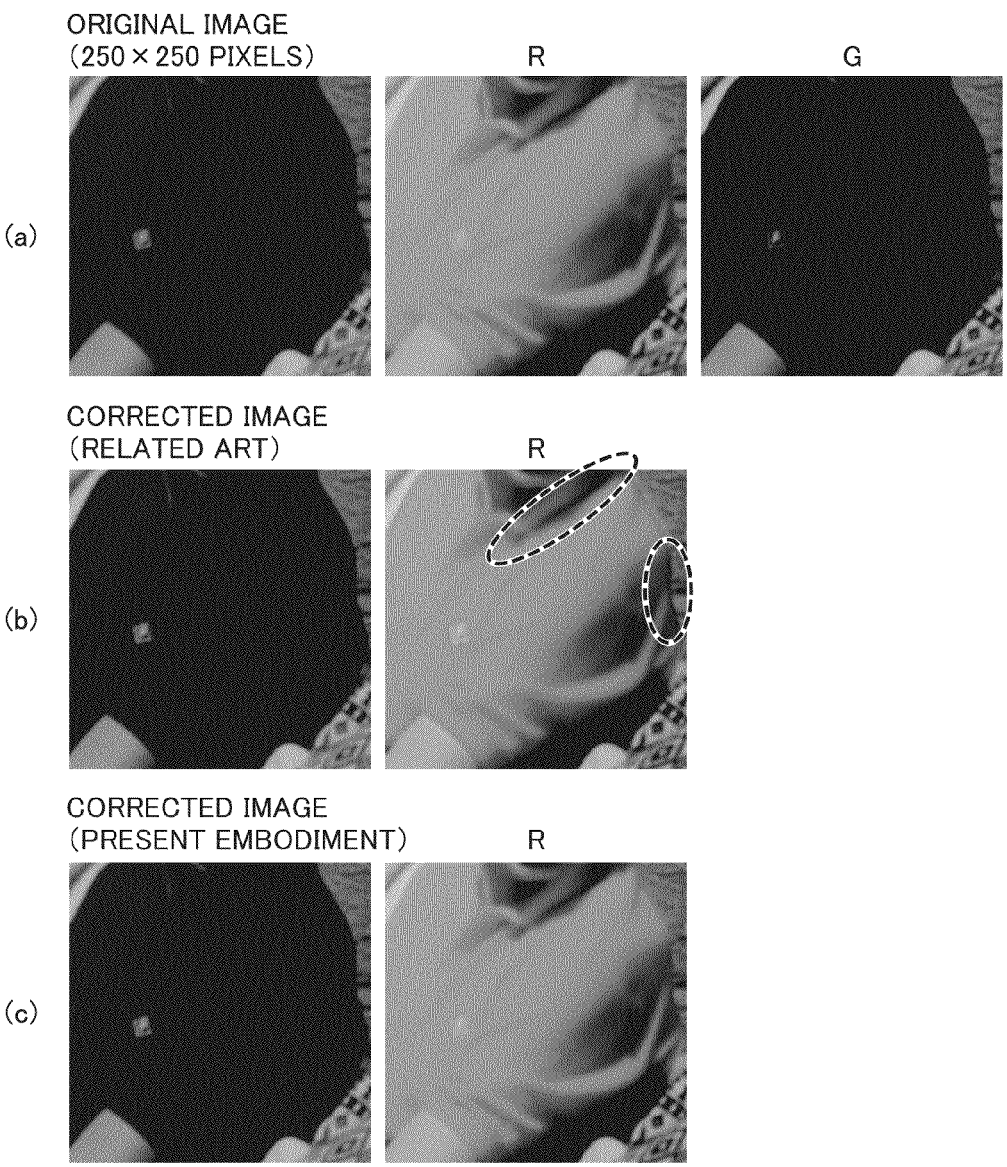
FIG. 30 is a diagram showing another example of the correction result by the image processing method according to the first embodiment of the present invention.

FIG. 30 and FIG. 31 are diagrams showing another example of the correction result by the image processing method according to the first embodiment of the present invention. In FIG. 30, (a) shows an input image to be processed, (b) shows the corrected image obtained by the image processing method according to the related art, and (c) shows the corrected image obtained by the image processing method according to the present embodiment.

As shown in FIG. 30(b), with the image processing method according to the related art, an end portion and a collar portion of the clothing are subjected to erroneous correction. However, as shown in FIG. 30(c), it is understood that the image processing method according to the present embodiment performs processing so as not produce such erroneous correction.

More specifically, the grayscale direction correlation as shown in FIG. 31(a) is calculated and the high frequency component of G (GH) of the input image is corrected based on the calculated grayscale direction correlation as shown in FIG. 31(b), whereby the high frequency component of G (GHred) for correcting R of the input image is appropriately calculated.

(f7: Modification)

In the foregoing description, R of the input image is corrected after the grayscale direction correlation is calculated for R of the input image and the high frequency component of G (GHred) for correcting R of the input image is calculated based on the calculated grayscale direction correlation, by way of example. Instead or in addition, it is obvious that the same image processing method can also be applied to B of the input image. Also in this case, it is obvious that the same effects can be achieved.

In the foregoing first embodiment, a process example in which the high frequency component of G (GH) of the input image is transported to Y (luminance) of the input image has been described. However, the same effects can be achieved also in the process of transporting the high frequency component between different color spaces such as the RGB color space and the YCrCb color space. For example, as disclosed in Japanese Laid-Open Patent Publication No. 2007-028041 above (Patent Document 1), when the process example of directly adding the high frequency component of G to R and/or B of the input image is applied, the image processing method according to the present embodiment can be applied in the same manner and achieves the same effects.

Figure 32:
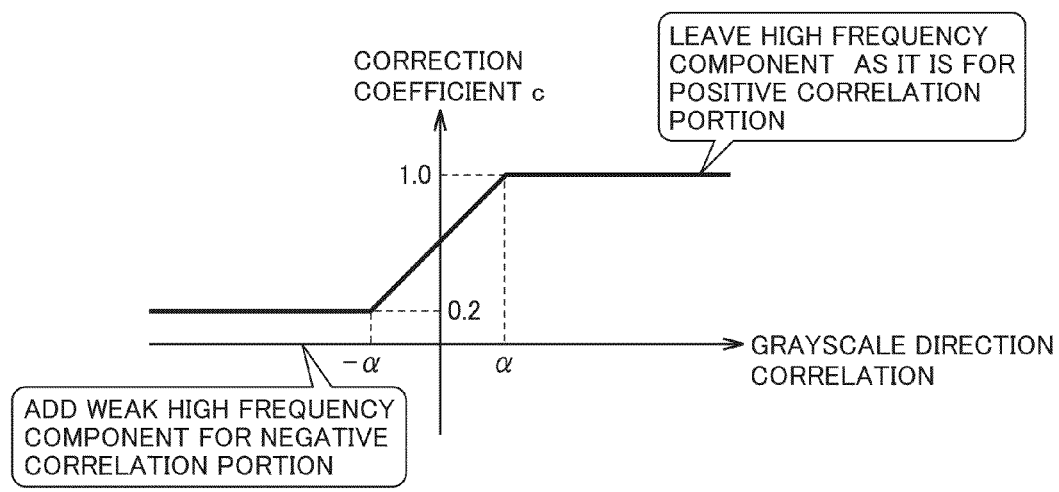
FIG. 32 is a diagram showing an example of a correction coefficient for calculating a high frequency component for correction according to a modification to the first embodiment of the present invention.

As for the correction coefficient c, correction may not be completely cancelled for the portion having a negative correlation but the degree of correction may be weakened. FIG. 32 is a diagram showing an example of the correction coefficient for calculating a high frequency component for correction according to a modification to the first embodiment of the present invention. With the correction coefficient c shown in FIG. 32, in order to weaken the degree of correction of the high frequency component of G in the portion having a negative correlation, if the grayscale direction correlation falls below $-\alpha$, for example, a correction coefficient c=0.2 is employed. The correction coefficient c for a negative correlation may be any value in the range from 0 to 1.0.

As described above, the image processing apparatus according to the present embodiment does not add or weakens the high frequency component for a region having a negative correlation. That is, the image processing apparatus according to the present embodiment adds the high frequency component to the color component to be corrected when the grayscale direction correlation for the region of interest indicates a positive correlation in which the grayscale directions of the first color component and the second color component are identical, whereas the image processing apparatus according to the present embodiment adds the high frequency component of the first color component that is reduced compared with the case of the positive correlation, to the color component to be corrected, that is, reduces the magnitude of the high frequency component compared with the case of a positive correlation when the grayscale direction correlation for the region of interest indicates a negative correlation in which the grayscale directions of the first color component and the second color component are opposite.

(f8: Advantages)

When the input image includes a blur due to axial aberration of the optical system or other reasons, if such a blur is corrected by simply transferring (adding) the high frequency component of the color (for example, G) having the best MTF characteristics to the high frequency component of another color (for example, R), a part of the region may be blurred on the contrary or the edge may undergo unnatural image processing. By contrast, in the present embodiment, it is determined whether to transport (add) to the high frequency component of another color by evaluating whether the direction of grayscale change is the same for each color, that is, the grayscale direction correlation, whereby image correction can be performed without giving adverse effects such as occurrence of a blur.

<G. Second Embodiment>

In the foregoing first embodiment, the process example in which the high frequency component is not added or is weakened if the grayscale direction correlation is a negative correlation has been described. By contrast, in a second embodiment, a process example of subtracting the high frequency component if the grayscale direction correlation is a negative correlation will be described.

The image processing method according to the second embodiment differs from the flowchart showing the procedure of the image processing method according to the first embodiment shown in FIG. 18 in the process of calculating a correction value from the high frequency component of the color component as a reference (typically, G) (step S5), and a detailed description of the other processes will not be repeated. The difference from the first embodiment will be mainly described below.

Figure 33:
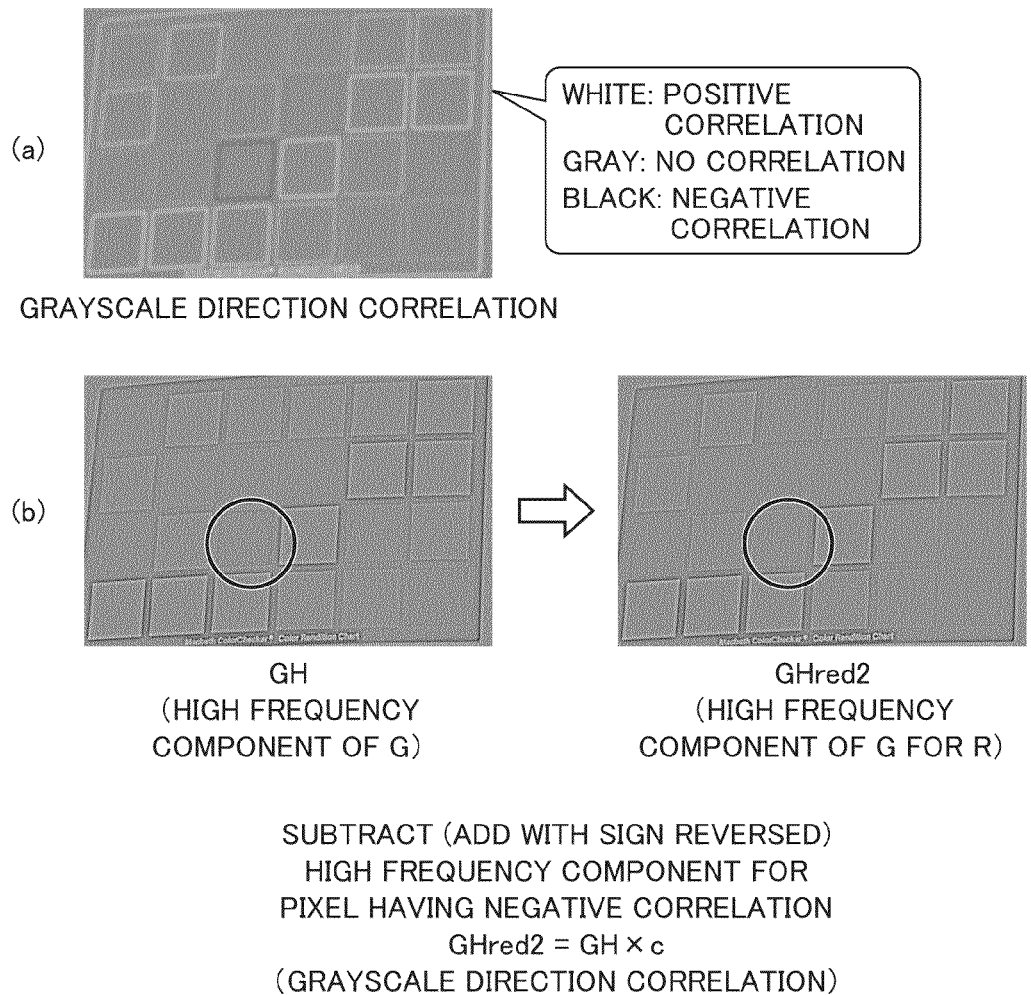
FIG. 33 is a diagram showing the process for calculating a high frequency component for correction according to a second embodiment of the present invention.
Figure 34:
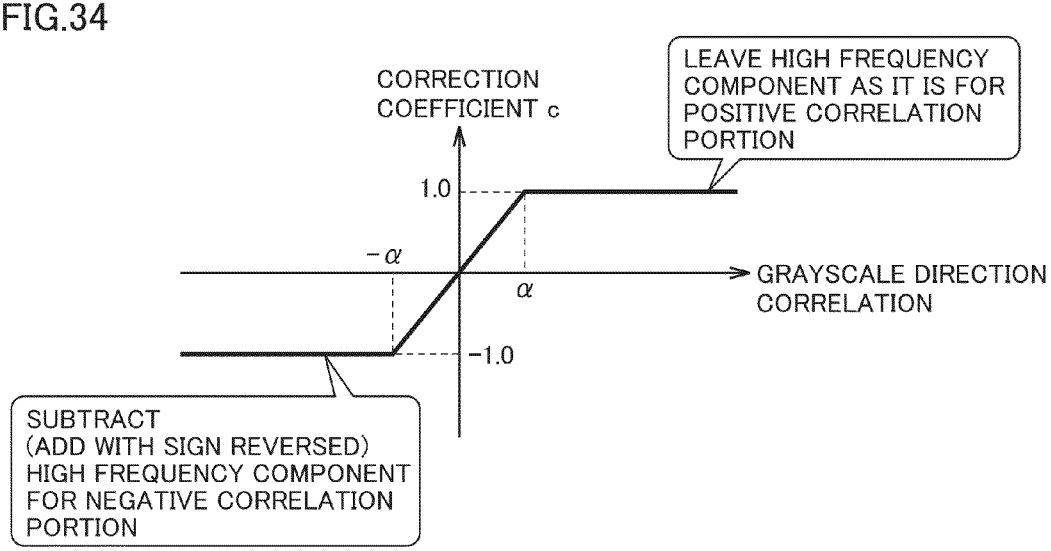
FIG. 34 is a diagram showing an example of the correction coefficient for calculating a high frequency component for correction according to the second embodiment of the present invention.

FIG. 33 is a diagram showing the process for calculating a high frequency component for correction according to the second embodiment of the present invention. FIG. 34 is a diagram showing an example of the correction coefficient for calculating a high frequency component for correction according to the second embodiment of the present invention.

When the grayscale direction correlation as shown in FIG. 33(a) is calculated, the high frequency component of G (GHred2) for correcting R of the input image is calculated using the calculated grayscale direction correlation. More specifically, the high frequency component of G (GHred2) for correcting R of the input image is generated such that the high frequency component is left in the portion having a positive correlation in the high frequency component of G (GH) of the input image as shown in FIG. 33 (b), and the high frequency component is subtracted in the portion having a negative correlation. The high frequency component of G (GHred) is generated using the correction coefficient c as shown in FIG. 34.

As for the correction coefficient c shown in FIG. 34, in order to leave the high frequency component of G as it is in the portion having a positive correlation, if the grayscale direction correlation exceeds α, the correction coefficient c=1 is employed. On the other hand, in order to subtract (add with the sign reversed) the high frequency component of G in the portion having a negative correlation, if the grayscale direction correlation falls below −α, the correction coefficient c=−1 is employed. In order to avoid a steep change between the positive correlation and the negative correlation, if the grayscale direction correlation falls within a range from −α to α, the correction coefficient is set to the linear function for the grayscale direction correlation, so that changes of the correction coefficient are smoothed.

The high frequency component of G (GHred2) for correcting R of the input image is generated using such a correction coefficient c, so that the edge is enhanced in the opposite direction to that in the image processing method according to the related art, in the portion having a negative correlation to Y.

Figure 35:
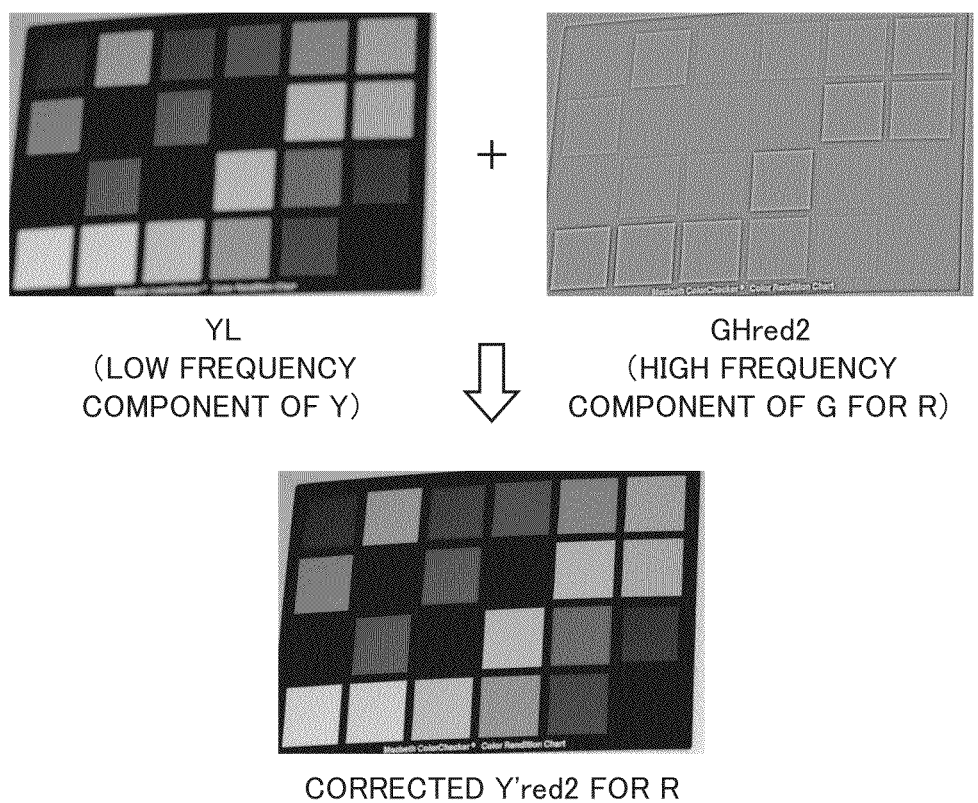
FIG. 35 is a diagram for explaining the correction process for an input image in the image processing method according to the second embodiment of the present invention.
Figure 37:
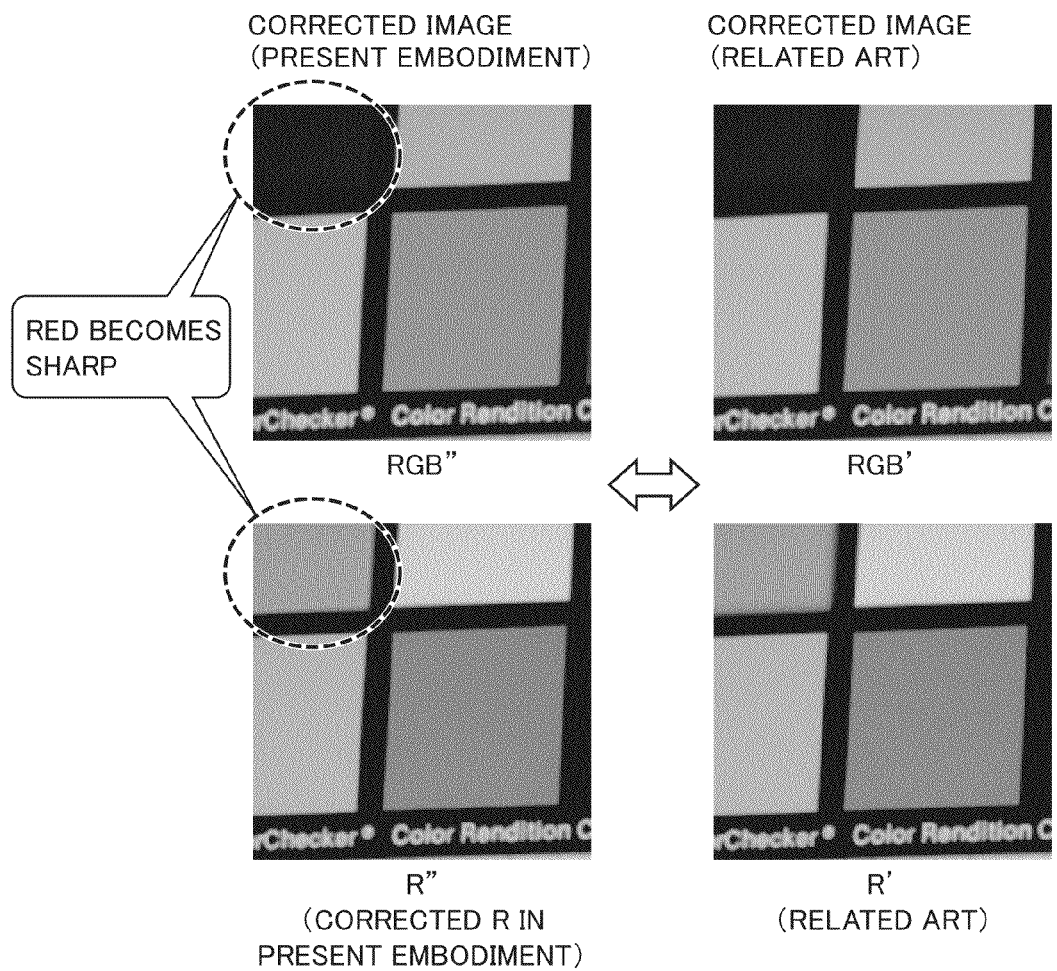
FIG. 37 is a diagram showing an example of the correction result by the image processing method according to the second embodiment of the present invention.

FIG. 35 is a diagram for explaining the correction process for an input image in the image processing method according to the second embodiment of the present invention. FIG. 36 is a diagram for explaining the effect of correction by the correction process for an input image shown in FIG. 35. FIG. 37 is a diagram showing an example of the correction result by the image processing method according to the second embodiment of the present invention.

Referring to FIG. 35, the high frequency component of G (GHred2) for correcting R of the input image is transported to the luminance of R (Y'red) of the input image. That is, for R of the input image, the corrected luminance for R (Y'red2) is calculated using the high frequency component of G (GHred2). More specifically, the luminance (Y'red2) is calculated by adding the high frequency component of G (GHred2) to the low frequency component of luminance (YL) of the input image.

As shown in FIG. 36, with such a correction method, the edge of the red patch portion in which a blur occurs due to the negative correlation as shown in FIG. 15 is corrected in the opposite direction to that in the example shown in FIG. 15.

Accordingly, as shown in FIG. 37, the red patch portion can be corrected so as to be sharper.

As described above, the image processing apparatus according to the present embodiment subtracts the high frequency component for a region having a negative correlation. That is, the image processing apparatus according to the present embodiment adds the high frequency component of the first color component to the color component to be corrected when the grayscale direction correlation for the region of interest indicates a positive correlation in which the grayscale directions of the first color component and the second color component are identical, whereas the image processing apparatus subtracts the high frequency component of the first color component from the color component to be corrected when the grayscale direction correlation for the region of interest indicates a negative correlation in which the grayscale directions of the first color component and the second color component are opposite.

In the present embodiment, it is determined whether to add to or subtract from the high frequency component of another color by determining whether the direction of grayscale change is the same or not for each color, that is, by evaluating the grayscale direction correlation, whereby image correction can be performed without giving adverse effects such as occurrence of a blur.

<H. Third Embodiment>

In the foregoing first and second embodiments, the process example of changing the correction methods using the high frequency component (adding, weakening, or reversely adding the high frequency component) depending on whether the grayscale direction correlation is a negative correlation for the entire image has been described.

However, in actuality, in an image region in which the spatial frequency is high (typically, a cluttered image area), the image looks better by enhancing the edge normally even when the grayscale change direction of the edge is different from the intended one. In a process example in a third embodiment, therefore, the correction methods are changed depending on the grayscale direction correlation only for an image region having few high frequency components.

In the image processing method according to the present embodiment, first, the input image to be processed is divided into a plurality of partial regions, and it is determined for each partial region whether it is a region having many high frequency components or few high frequency components. Then, for the region having many high frequency components, the image processing method according to the related art is applied, and correction is performed using the high frequency component of the input image, irrespective of the grayscale direction correlation. By contrast, for the region having few high frequency components, the image processing method according to the foregoing first or second embodiment is applied, and the correction methods using the high frequency component are changed depending on the grayscale direction correlation.

Figure 38:
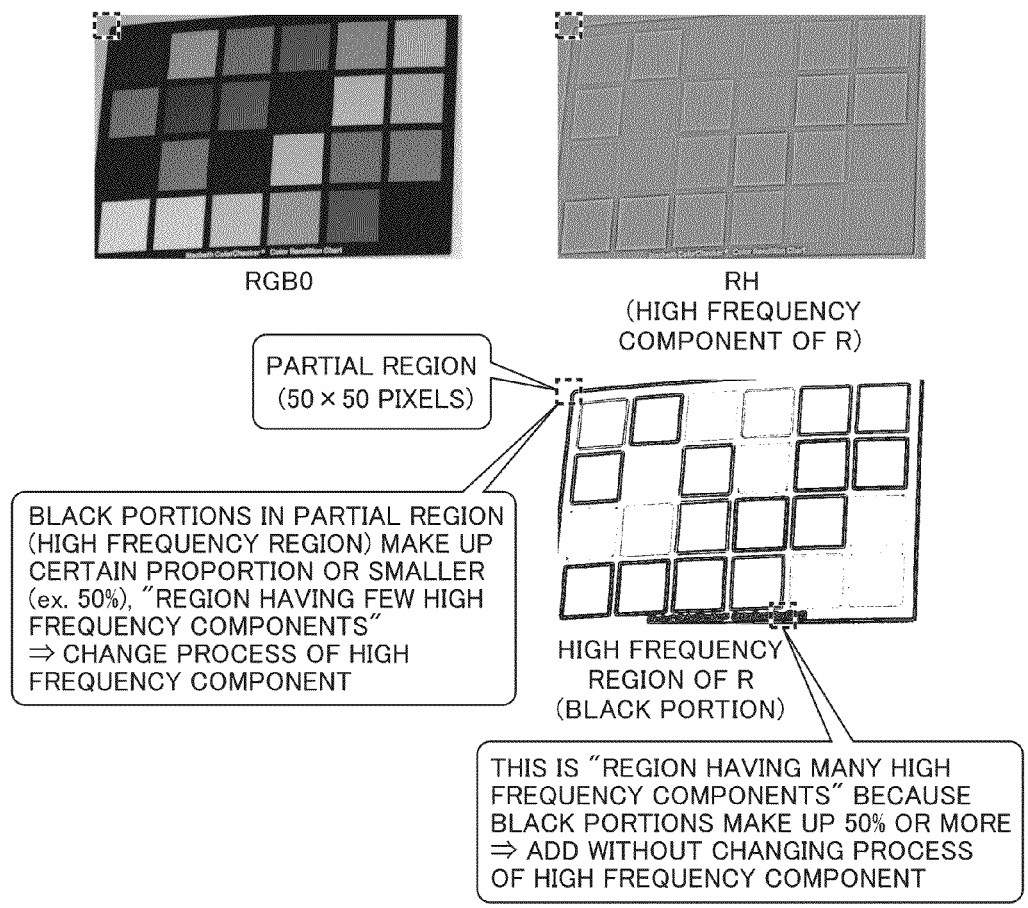
FIG. 38 is a diagram for explaining the overview of the image processing method according to a third embodiment of the present invention.
Figure 39:
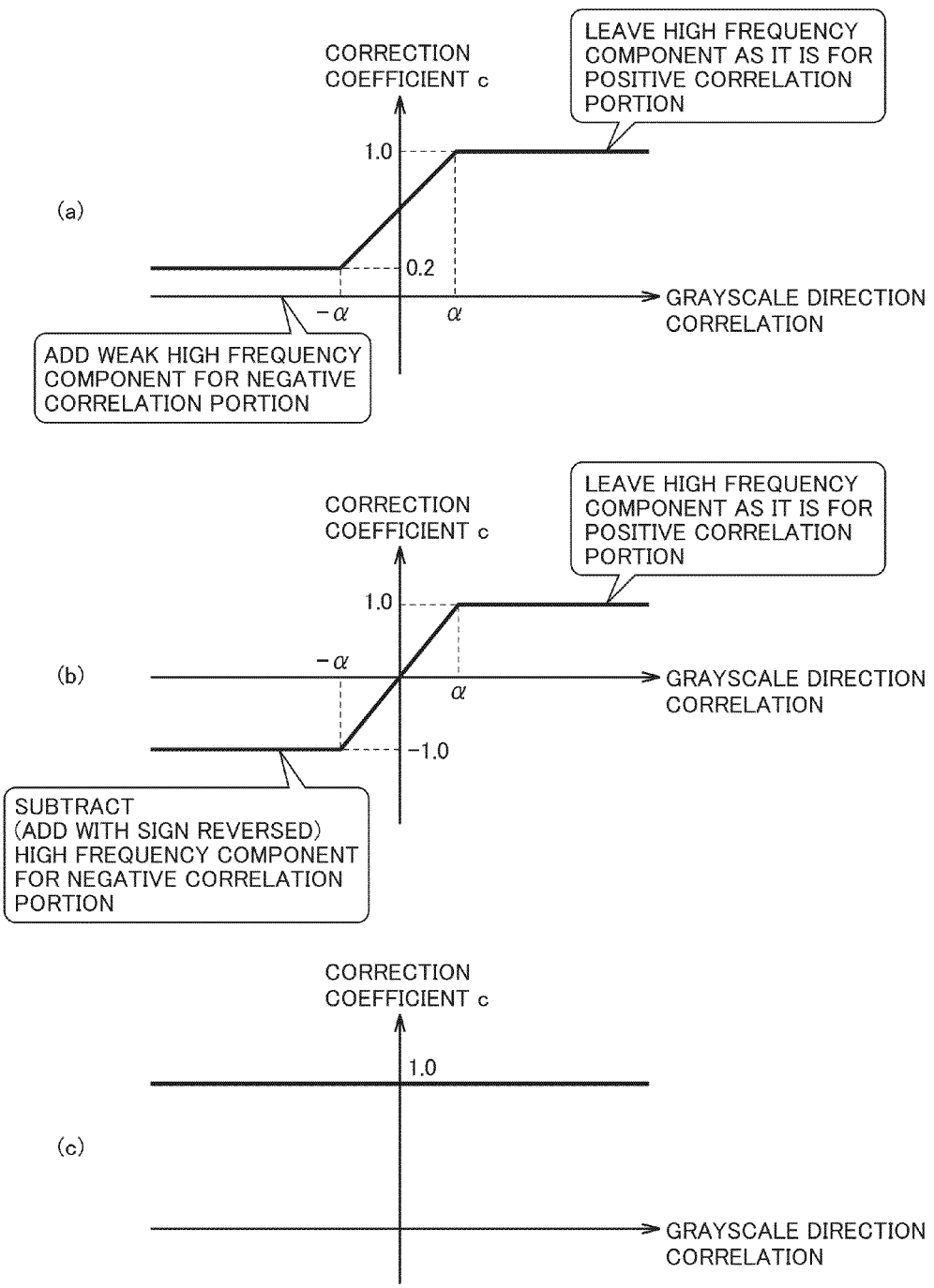
FIG. 39 is a diagram showing an example of a correction coefficient used in the image processing method according to the third embodiment of the present invention.

FIG. 38 is a diagram for explaining the overview of the image processing method according to the third embodiment of the present invention. FIG. 39 is a diagram showing an example of the correction coefficient used in the image processing method according to the third embodiment of the present invention.

Referring to FIG. 38, first, image processing apparatus 1 divides the input image into a plurality of partial regions (dotted-line regions). Each partial region is set in a size of, for example, 50 pixels×50 pixels. Image processing apparatus 1 then determines for each partial region whether it is a region having many high frequency components or a region having few high frequency components. Image processing apparatus 1 then applies the image processing method according to the related art shown in FIG. 5 to a region having many high frequency components and applies the image processing method according to the foregoing first or second embodiment to a region having few high frequency components. That is, image processing apparatus 1 changes the processes of the high frequency component (not adding, weakening, or reversely adding the high frequency component) depending on the grayscale direction correlation only for a region having few high frequency components.

In other words, image processing apparatus 1 performs correction using the correction coefficient c shown in FIG. 39(a) or FIG. 39(b) for a region of the input image having few high frequency components and performs correction using the correction coefficient c shown in FIG. 39(c) for a region of the input image having many high frequency components. This correction coefficient c shown in FIG. 39(c) is always "1" independently of the grayscale direction correlation.

Whether a partial region set in the input image has many high frequency components or few high frequency components can be determined, for example, based on whether the absolute value of the high frequency component of R (RH) is a threshold (for example, 10) or greater when R of the input image is corrected, as described in the foregoing first or second embodiment. According to this determination method, a region having the absolute value of the high frequency component of R (RH) equal to or greater than the threshold is determined to be a high frequency region of R, and if the proportion of the high frequency regions in the partial region is a certain value or smaller (for example, 50% or less), the region is determined to have few high frequency components. By contrast, if the proportion of the high frequency regions in the partial region exceeds the certain value (for example, over 50%), the region is determined to have many high frequency components.

As described above, the image processing apparatus according to the present embodiment determines whether the region of interest includes many high frequency components. If the region of interest does not include many high frequency components, the second color component for the region of interest is corrected in accordance with the method depending on the grayscale direction correlation, and if the region of interest includes many high frequency components, the color component to be corrected for the region of interest is corrected in accordance with a predetermined method independently of the grayscale direction correlation. That is, the correction methods using the high frequency component are changed (not add/weaken/subtract) only for the region that has a negative correlation and is a low frequency region (a region having few high frequency components).

In the present embodiment, after whether to apply the correction depending on the grayscale direction correlation is determined, it is chosen whether to uniformly enhance the edge with the image processing method according to the related art or to change the methods of applying the high frequency component depending on the grayscale direction correlation. This can increase the processing speed and enables more natural correction of an image as a whole.

<I. Fourth Embodiment>

In the foregoing first to third embodiments, an example in which the NCC method is used to calculate the grayscale direction correlation has been described. However, the grayscale direction correlation can be calculated using any other methods.

That is, although in Expression (1) above, the grayscale direction correlation is calculated using the NCC method, the correlation value of the high frequency components (the correlation values between RH and GH) may be calculated by Expression (4) below. This Expression (4) does not include square-root calculation and therefore can speed up the operation processing.

$$A = \sum_{j=-5}^{5} \sum_{i=-5}^{5} RH(i, j) \cdot GH(i, j) \qquad (4)$$

$$B = \sum_{j=-5}^{5} \sum_{i=-5}^{5} RH(i, j)^2 \times \sum_{j=-5}^{5} \sum_{i=-5}^{5} GH(i, j)^2$$

where A>0: the correlation value of the high frequency components=A×A/B
otherwise: the correlation value of the high frequency components=−A×A/B The grayscale direction correlation is calculated by multiplying the result obtained through Expression (4) by the absolute value of RH (information as to the edge of R or not (whether the grayscale change is large)) according to Expression (5) below in the same manner as in the first embodiment.

Grayscale direction correlation=correlation value of high frequency component×|RH|  (5)

Figure 40:
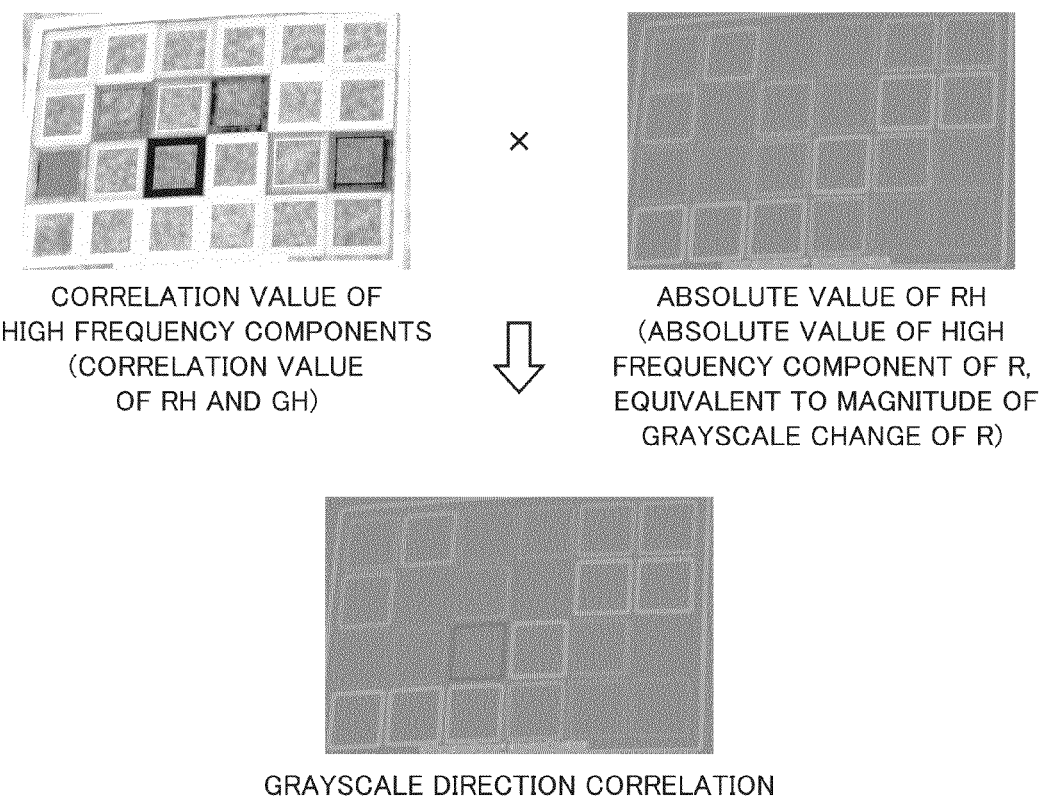
FIG. 40 is a diagram showing an example of the calculation result of grayscale direction correlation in the image processing method according to a fourth embodiment of the present invention.

FIG. 40 is a diagram showing an example of the calculation result of grayscale direction correlation in the image processing method according to the fourth embodiment of the present invention. As shown in FIG. 40, it is understood that the same result as in the grayscale direction correlation calculated using the NCC method (see FIG. 22) can be obtained.

As described above, the method of calculating a "correlation value of high frequency components" used to calculate a grayscale direction correlation is not limited to the NCC method, and any method or process can be employed as long as a correlation value is reversed between the case where the grayscale change directions of the edge are identical and the case where they are opposite.

<J. Advantages>

According to the embodiments of the present invention, when the input image includes a blur due to axial aberration of the optical system or other reasons, if such a blur is corrected by simply transporting (adding) the high frequency component of the color (for example, G) having the best MTF characteristics to the high frequency component of another color (for example, R), a part of the region may be blurred on the contrary or the edge may undergo unnatural image processing. By contrast, the present embodiment can correct a blur in a more natural form.

Since such a blur can be corrected effectively, a more natural input image of a subject can be acquired without necessarily improving the MTF characteristics. Accordingly, when the invention is implemented in a digital camera or other devices, the optical characteristics of the lens do not have to be excessively enhanced, thereby simplifying the apparatus as a whole and reducing the costs.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

The invention claimed is:

1. An image processing apparatus comprising:
a hardware processor, wherein the hardware processor is structured to perform:
accepting an input image represented with a plurality of color components including at least first and second color components;
calculating a grayscale direction correlation indicating whether grayscale directions of the first color component and the second color component are identical or opposite for a region of interest in the input image;
calculating a high frequency component of the first color component for the region of interest; and
correcting the second color component for the region of interest using the calculated high frequency component of the first color component in accordance with a method depending on the calculated grayscale direction correlation.

2. The image processing apparatus according to claim 1, wherein
the hardware processor is structured to: add the high frequency component of the first color component to the second color component when the grayscale direction correlation for the region of interest indicates a positive correlation in which grayscale directions of the first color component and the second color component are identical, and
the hardware processor is structured to not correct the second color component using the high frequency component of the first color component when the grayscale direction correlation for the region of interest indicates a negative correlation in which grayscale directions of the first color component and the second color component are opposite.

3. The image processing apparatus according to claim 2, wherein
the hardware processor is structured to:
determine that the grayscale direction correlation for the region of interest is the positive correlation when the grayscale direction correlation for the region of interest exceeds a predetermined value $\alpha$ ($\alpha>0$), and determines that the grayscale direction correlation for the region of interest is the negative correlation when the grayscale direction correlation for the region of interest falls below a predetermined value $\beta$ ($\beta<0$), and
add the high frequency component of the first color component that is reduced compared with a case of the positive correlation, to the second color component when the grayscale direction correlation for the region of interest falls within a range from the predetermined value $\alpha$ to the predetermined value $\beta$.

4. The image processing apparatus according to claim 1, wherein
the hardware processor is structured to:
add the high frequency component of the first color component to the second color component when the grayscale direction correlation for the region of interest indicates a positive correlation in which grayscale directions of the first color component and the second color component are identical, and
add the high frequency component of the first color component that is reduced compared with a case of the positive correlation, to the second color component when the grayscale direction correlation for the region of interest indicates a negative correlation in which grayscale directions of the first color component and the second color component are opposite.

5. The image processing apparatus according to claim 1, wherein
the hardware processor is structured to:
adds the high frequency component of the first color component to the second color component when the grayscale direction correlation for the region of interest indicates a positive correlation in which grayscale directions of the first color component and the second color component are identical, and
subtracts the high frequency component of the first color component from the second color component when the grayscale direction correlation for the region of interest indicates a negative correlation in which grayscale directions of the first color component and the second color component are opposite.

6. The image processing apparatus according to claim 1, wherein
the hardware processor is structured to:
determine whether the region of interest includes many high frequency components,
if the region of interest does not include many high frequency components, correct the second color component for the region of interest in accordance with a method depending on the grayscale direction correlation, and
if the region of interest includes many high frequency components, correct the second color component for the region of interest in accordance with a predetermined method, independently of the grayscale direction correlation.

7. The image processing apparatus according claim 1, wherein the hardware processor is structured to correct a frequency band degraded compared with an MTF characteristic of the first color component, among MTF characteristics of the second color component.

8. The image processing apparatus according to claim 1, wherein the hardware processor is structured to calculate the grayscale direction correlation based on high frequency components included in the first color component and the second color component.

9. The image processing apparatus according to claim 8, wherein the hardware processor is structured to calculate the grayscale direction correlation using a correlation value obtained through pattern matching of the high frequency components included in the first color component and the second color component.

10. The image processing apparatus according to claim 9, wherein the hardware processor is structured to calculate the grayscale direction correlation by multiplying the correlation value by the magnitude of grayscale change of the second color component.

11. The image processing apparatus according to claim 9, wherein the hardware processor is structured to calculate the correlation value using an NCC method.

12. An image processing method comprising:
   acquiring, from a storage medium or from an imaging unit comprising a camera, an input image represented with a plurality of color components including at least first and second color components;
   calculating a grayscale direction correlation indicating whether grayscale directions of the first color component and the second color component are identical or opposite for a region of interest in the input image;
   calculating a high frequency component of the first color component for the region of interest; and
   correcting the second color component for the region of interest using the high frequency component of the first color component in accordance with a method depending on the grayscale direction correlation.

13. A non-transitory storage medium having computer-executable instructions stored thereon that, when executed by a computer, cause a computer to perform:
   acquiring, from a storage medium or from an imaging unit comprising a camera, an input image represented with a plurality of color components including at least first and second color components;
   calculating a grayscale direction correlation indicating whether grayscale directions of the first color component and the second color component are identical or opposite for a region of interest in the input image;
   calculating a high frequency component of the first color component for the region of interest; and
   correcting the second color component for the region of interest using the high frequency component of the first color component in accordance with a method depending on the grayscale direction correlation.

* * * * *